United States Patent
Chand et al.

(10) Patent No.: US 10,764,646 B2
(45) Date of Patent: Sep. 1, 2020

(54) SYSTEM AND METHOD FOR MANAGING INTERACTIVE MEDIA

(71) Applicant: THROUGH THE LENS ENTERTAINMENT CORPORATION, Pittsburgh, PA (US)

(72) Inventors: Aditya Vikram Chand, Brooklyn, NY (US); David K Koh, Brooklyn, NY (US)

(73) Assignee: THROUGH THE LENS ENTERTAINMENT CORPORATION, Pittsburgh, PA (US)

(*) Notice: Subject to any disclaimer, the term of this patent is extended or adjusted under 35 U.S.C. 154(b) by 0 days.

(21) Appl. No.: 15/687,425

(22) Filed: Aug. 25, 2017

(65) Prior Publication Data

US 2018/0063589 A1    Mar. 1, 2018

Related U.S. Application Data

(60) Provisional application No. 62/379,637, filed on Aug. 25, 2016.

(51) Int. Cl.
| | |
|---|---|
| *H04N 21/475* | (2011.01) |
| *H04N 21/258* | (2011.01) |
| *H04N 21/658* | (2011.01) |
| *H04N 21/2187* | (2011.01) |
| *H04N 21/24* | (2011.01) |
| *H04N 21/431* | (2011.01) |
| *H04N 21/81* | (2011.01) |

(52) U.S. Cl.
CPC ..... *H04N 21/4758* (2013.01); *H04N 21/2187* (2013.01); *H04N 21/2407* (2013.01); *H04N 21/258* (2013.01); *H04N 21/25883* (2013.01); *H04N 21/4312* (2013.01); *H04N 21/6582* (2013.01); *H04N 21/8173* (2013.01)

(58) Field of Classification Search
CPC ................. H04N 21/4758; H04N 21/2187
See application file for complete search history.

(56) References Cited

U.S. PATENT DOCUMENTS

| | | | |
|---|---|---|---|
| 6,947,966 B1 | 9/2005 | Oko, Jr. et al. | |
| 2004/0151403 A1* | 8/2004 | Scheier | G06F 3/002 382/325 |

(Continued)

OTHER PUBLICATIONS

International Search Report and Written Opinion issued in corresponding International Application No. PCT/US2017/048761, dated Dec. 22, 2017, 14 pages.

*Primary Examiner* — Olugbenga O Idowu
(74) *Attorney, Agent, or Firm* — Lewis Roca Rothgerber Christie LLP

(57) ABSTRACT

According to some example embodiments of the present invention, in a system for managing interactive media, the system includes: a processor; and a memory coupled to the processor, wherein the memory stores instructions that, when executed by the processor, cause the processor to: monitor a broadcast of a live media content production; receive, from a plurality of user devices, preference data indicating preferences for modifying content of the live media content production; aggregate the preference data; and transmit the preference data to a media production device for modifying the live media content product in real time during the broadcast.

20 Claims, 36 Drawing Sheets

(56) References Cited

U.S. PATENT DOCUMENTS

| | | |
|---|---|---|
| 2005/0120389 A1* | 6/2005 | Boss .................... G06Q 30/02 |
| | | 725/135 |
| 2007/0033625 A1 | 2/2007 | Chiu |
| 2008/0034392 A1* | 2/2008 | McCarthy .......... H04N 5/44543 |
| | | 725/61 |
| 2014/0068432 A1 | 3/2014 | Kucharz et al. |
| 2014/0274353 A1 | 9/2014 | Benson et al. |
| 2016/0044226 A1* | 2/2016 | Williams ........... H04N 5/23206 |
| | | 348/211.3 |

* cited by examiner

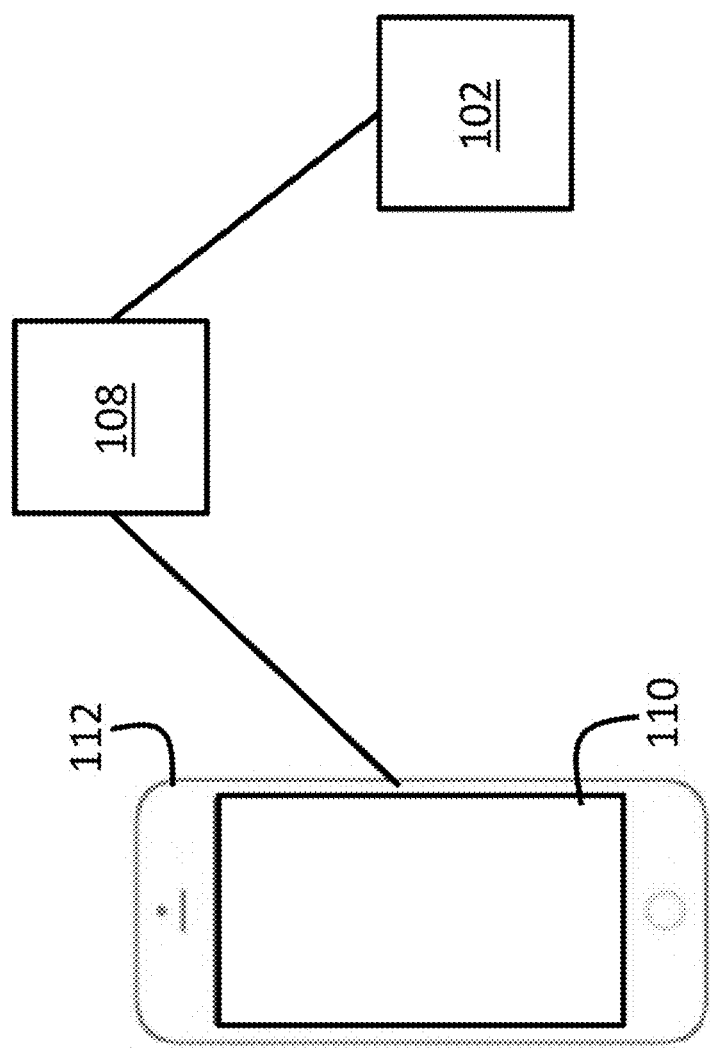

SYSTEM AND METHOD FOR MANAGING INTERACTIVE MEDIA

CROSS-REFERENCE TO RELATED APPLICATION(S)

This application claims the benefit of U.S. Provisional Application No. 62/379,637, entitled "SYSTEM AND METHOD FOR MANAGING INTERACTIVE MEDIA," filed in the United States Patent and Trademark Office on Aug. 25, 2016, the entire content of which is incorporated herein by reference.

BACKGROUND

In recent years, personal computer systems, including smartphones and tablet computers, have become a ubiquitous part of modern life. Technological innovations have enabled high speed communication and transmission of data.

Producers of media and entertainment content may leverage such technologies for the purposes of facilitating increased audience engagement and interaction. Accordingly, aspects of embodiments of the present invention relate to a system and method for managing interactive media.

The above information disclosed in this Background section is only for enhancement of understanding of the background of the disclosure and therefore it may contain information that does not form prior art.

SUMMARY

Aspects of embodiments of the present invention relate to a system and method for managing interactive media.

According to some example embodiments of the present invention, in a system for managing interactive media, the system includes: a processor; and a memory coupled to the processor, wherein the memory stores instructions that, when executed by the processor, cause the processor to: monitor a broadcast of a live media content production; receive, from a plurality of user devices, preference data indicating preferences for modifying content of the live media content production; aggregate the preference data; and transmit the preference data to a media production device for modifying the live media content product in real time during the broadcast.

According to some example embodiments, the media production device is operated by a content creator, and the instructions further cause the processor to: receive a signal, from the media production device, to initiate a stage of the live media content production; and transmit a signal to the plurality of user devices indicating a request to provide a selection from among one or more functions corresponding to the stage of the live media content production.

According to some example embodiments, the instructions further cause the processor to receive, from one or more of the plurality of user devices during the broadcast of the live media content production, data for exchanging currency.

According to some example embodiments, each of the plurality of user devices are configured to run an application for enabling transmission of the preference data.

According to some example embodiments, the application for enabling transmission of the preference data is configured to display a user interface layered on top of an independent graphical user interface running independently from the application.

According to some example embodiments, at least one of the plurality of user devices is selected from the group consisting of a personal computer, a television, a smart telephone, and a remote control.

According to some example embodiments, the instructions further cause the processor to: receive, from one or more of the plurality of user devices, demographic data corresponding to one or more users operating the one or more of the plurality of user devices; and transmit the demographic data to the media production device for display thereby.

According to some example embodiments, the instructions further cause the processor to: receive, from the media production device, video data corresponding to the broadcast of the live media content production; and transmit, to one or more of the plurality of user devices, the video data for display thereby.

According to some example embodiments, the instructions further cause the processor to automatically modify the live media content production during the broadcast in response to the preference data without human intervention.

According to some example embodiments of the present invention, in a method for managing interactive media, the method includes: monitoring, by a processor, a broadcast of a live media content production; receiving, by the processor, from a plurality of user devices, preference data indicating preferences for modifying content of the live media content production; aggregating, by the processor, the preference data; and transmitting, by the processor, the preference data to a media production device for modifying the live media content product in real time during the broadcast.

According to some example embodiments, the media production device is operated by a content creator, and the method further includes: receiving, by the processor, a signal, from the media production device, to initiate a first stage of the live media content production; and transmitting, by the processor, a signal to the plurality of user devices indicating a request to provide a selection from among one or more functions corresponding to the first stage of the live media content production.

According to some example embodiments, the method further includes receiving, by the processor, from one or more of the plurality of user devices during the broadcast of the live media content production, data for exchanging currency.

According to some example embodiments, each of the plurality of user devices are configured to run an application for enabling transmission of the preference data.

According to some example embodiments, the application for enabling transmission of the preference data is configured to display a user interface layered on top of an independent graphical user interface running independently from the application.

According to some example embodiments, at least one of the plurality of user devices is selected from the group consisting of a personal computer, a television, a smart telephone, and a remote control.

According to some example embodiments, the method further includes: receiving, by the processor, from one or more of the plurality of user devices, demographic data corresponding to one or more users operating the one or more of the plurality of user devices; and transmitting, by the processor, the demographic data to the media production device for display thereby.

According to some example embodiments, the method further includes: receiving, by the processor, from the media production device, video data corresponding to the broadcast of the live media content production; and transmitting, by the processor, to one or more of the plurality of user devices, the video data for display thereby.

According to some example embodiments, the method further includes automatically modifying, by the processor, the live media content production during the broadcast in response to the preference data without human intervention.

According to some example embodiments of the present invention, in a system for managing interactive media, the system includes: a processor; and a memory coupled to the processor, wherein the memory stores instructions that, when executed by the processor, cause the processor to: monitor a media content production; receive a signal, from a device operated by a content creator, to initiate a stage of the media content production; transmit a signal to a plurality of user devices indicating a request to provide a selection from among one or more functions corresponding to the stage of the media content production; receive data from one or more of the plurality of user devices indicating corresponding selections of the one or more functions; aggregate the data received from the one or more of the plurality of user devices; and transmit the aggregated data to the device operated by the content creator for display thereby.

According to some example embodiments, the instructions further cause the processor to automatically modify the live media content production during the broadcast in response to the aggregated data without human intervention.

BRIEF DESCRIPTION OF THE DRAWINGS

A more complete appreciation of the present disclosure, and many of the attendant features and aspects thereof, will become more readily apparent as the disclosure becomes better understood by reference to the following detailed description when considered in conjunction with the accompanying drawings, wherein:

FIGS. 4A-4I illustrate examples of a user interface of an interactive media application for media content consumers, according to some examples of the present invention;

DESCRIPTION

Aspects of the present invention are described in one or more embodiments in the following description with reference to the figures, in which like numerals represent the same or similar elements. While the invention is described in terms of various embodiments, it will be appreciated by those skilled in the art that it is intended to cover alternatives, modifications, and equivalents as may be included within the spirit and scope of the invention as defined by the appended claims and their equivalents as supported by the following disclosure and drawings.

The art world is moving toward a new experiential form of entertainment, in which different mediums blend together to create an immersive multi-dimensional experience. Embodiments of the present invention aim to develop a sustainable and accessible platform for transforming the experience of art, entertainment, and media consumption, into an interactive experience beyond mere passive consumption of media content.

Accordingly, embodiments of the present invention are directed to systems and methods for managing and facilitating an interactive experience in the context of digital media between media consumers and media producers. To that end, embodiments of the present invention provide a multi-functional host platform, described in more detail below, that enables consumers (e.g., viewers) of media content to interact, in real time, with media content producers (e.g., television show creators). At the same time, embodiments of the present invention provide a mechanism by which media producers can monitor the characteristics and preferences of consumers thereby enabling media producers to provide content that satisfies the desires of consumers. As used herein, the term media content refers to any experiential, audio, or visual content, derived from any industry, and that is conveyed or delivered to users (e.g., by way of media content distribution platform 104). For example, media content may include broadcast television content, radio content, streaming digital media content, live performances or events in which users are in physical proximity (e.g., within visual or audible range) to the live performances or events, and the like.

Figure 1:
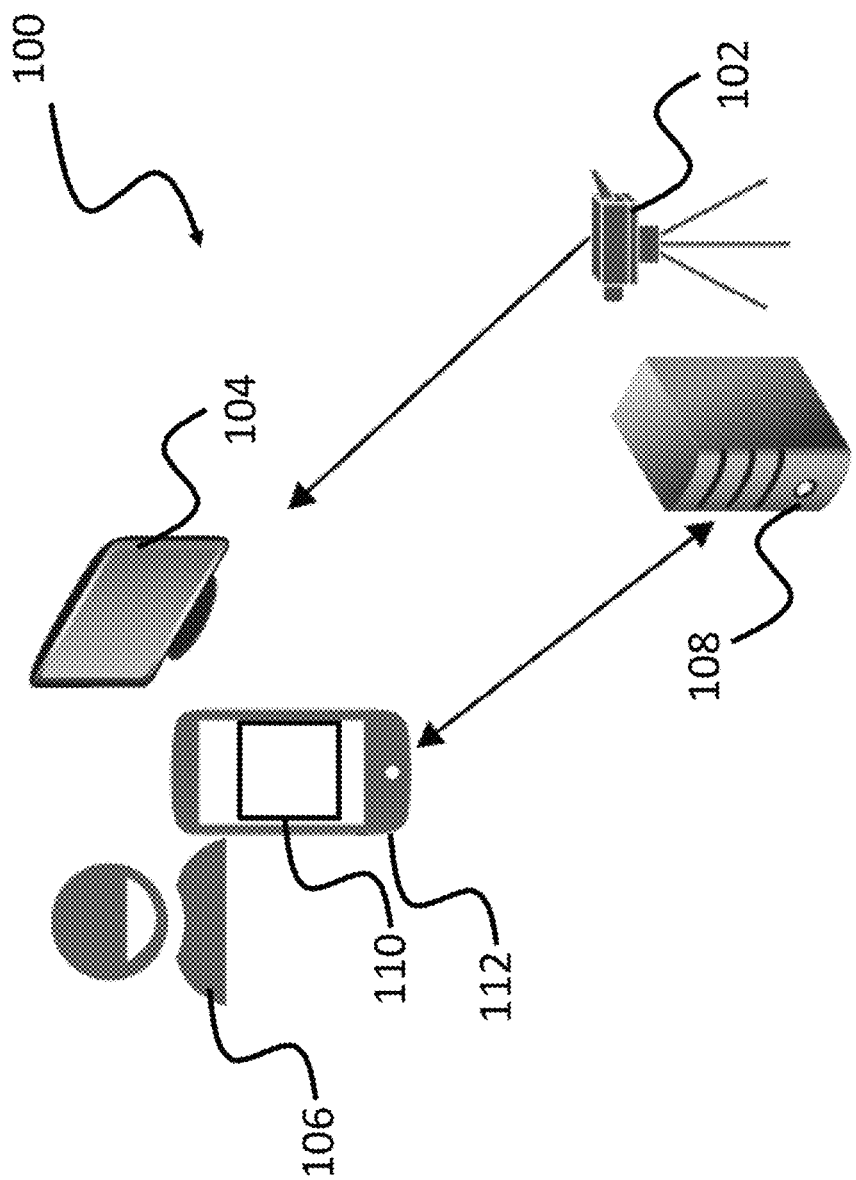
FIG. 1 is a block diagram illustrating an interactive media management system, according to some example embodiments of the present disclosure.

FIG. 1 illustrates an interactive media management system 100 according to some embodiments of the present invention. According to embodiments of the present invention, viewers or consumers of media content are enabled to become active participants in what is displayed and to guide or influence the direction of media content. At the same time, media content producers can interact with their audience, for example, by receiving feedback from viewers to create or modify the media content according to the viewer feedback.

For example, as shown in FIG. 1, a media content creator (e.g., a television studio or production company) 102 may produce media content that is distributed to consumers (e.g., by way of a suitable communication network, or during a live performance) by way of a media content distribution platform (e.g., a television, tablet, smartphone, laptop computer, desktop computer, etc.) 104 operated by a viewer or consumer 106. Additionally, the media content creator 102 may operate or control an interactive media server 108, configured to distribute or transmit an interactive media application 110 to an electronic device 112 operated by the consumer 106. The electronic device 112 may be any suitable electronic device or computer system such as a smartphone, tablet, personal computer, laptop, and the like. Additionally, as will be described in more detail below, according to some embodiments, the electronic device 112 and the media content distribution platform 104 may be the same device or the electronic device 112 and the media content distribution platform 104 may be separate standalone devices. Additionally, according to some embodiments, as discussed above, the media content may include live or in person performances or events, in which users or viewers consume the media content in person. Thus, in some embodiments, the media content distribution platform 104 may be a live performance or event venue.

As will be described in more detail below, during distribution of media content to the media content distribution platform 104, the consumer 106 may interact with the electronic device 112 and the interactive media application 110 to exchange (e.g., send and receive) signals with the interactive media server 108.

Figure 2:
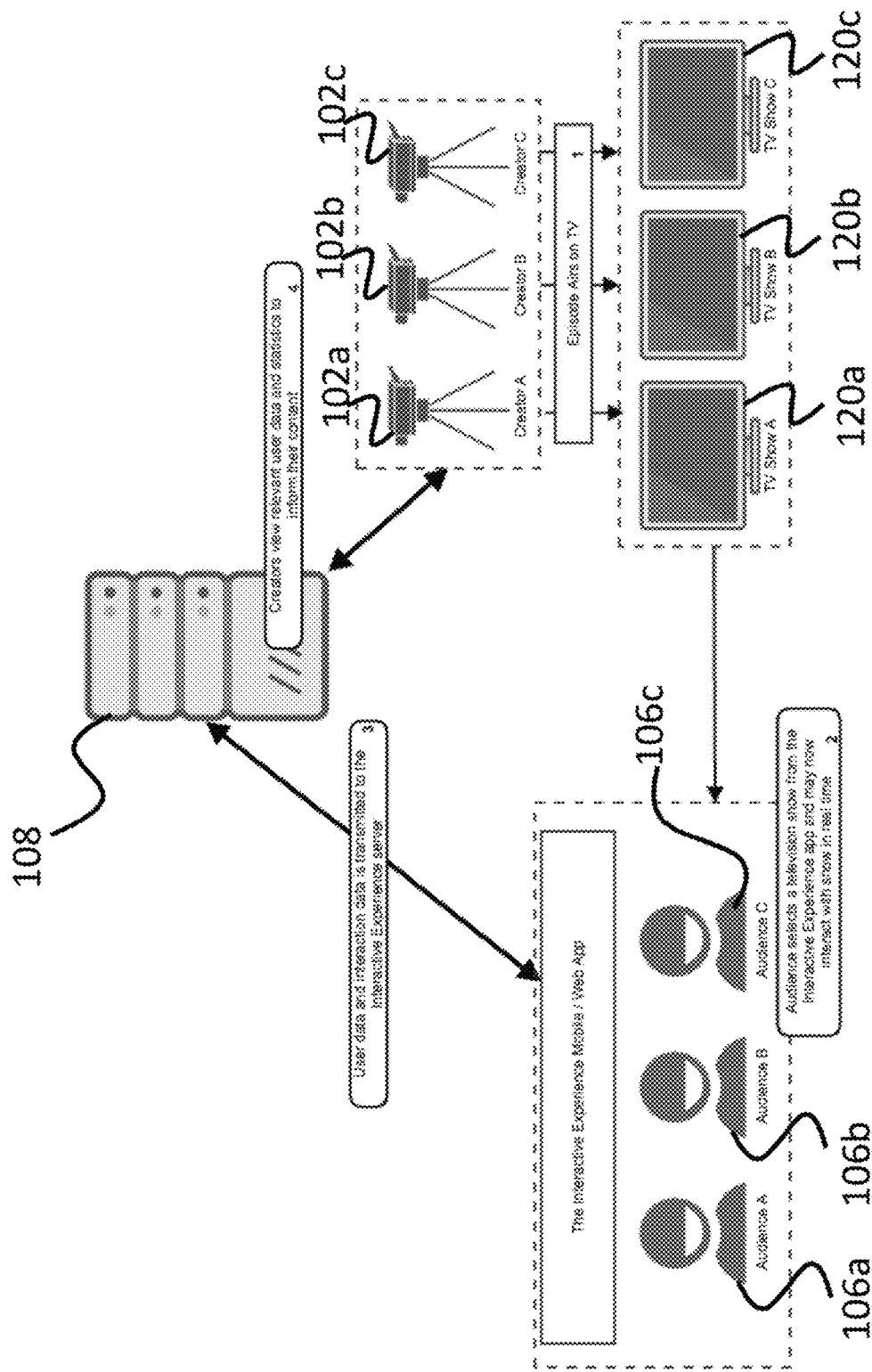
FIG. 2 is a block diagram illustrating further details of an interactive media management system, according to some example embodiments of the present disclosure.

FIG. 2 shows further details of a system and method for managing interactive media, according to some embodiments of the present invention. As illustrated in FIG. 2, according to some embodiments, the interactive media server 108 may operate as a hub or backend platform for hosting and facilitating the exchange of data between a plurality of different media creators 102a-102c, who produce and distribute different media content (e.g., television shows) 120a-120c, which is consumed or viewed by a plurality of audiences or audience members 106a-106c. The viewers or audience members 106a-106c may interact with the media creators 102a-102c by way of the interactive media application 110 while watching or consuming the media content in the corresponding form (e.g., television, live performance, etc.). As will be discussed in more detail, the application 110 may also operate as a widget or layer displayed over a desktop or other media display device.

Accordingly, the interactive media management system 100 may enable consumers of media content and creators of media content to exchange information with one another during the broadcast of media content, in real time, and enable the creators of the media content to modify or control the media content according to the preferences and feedback from viewers, thereby providing an interactive experience to consumers of media content. At the same time, as will be described in more detail below, the interactive media management system 100 provides a platform from which media creators 102a-102c can capture and monitor various information about the viewership and preferences of their audience.

Figure 3:
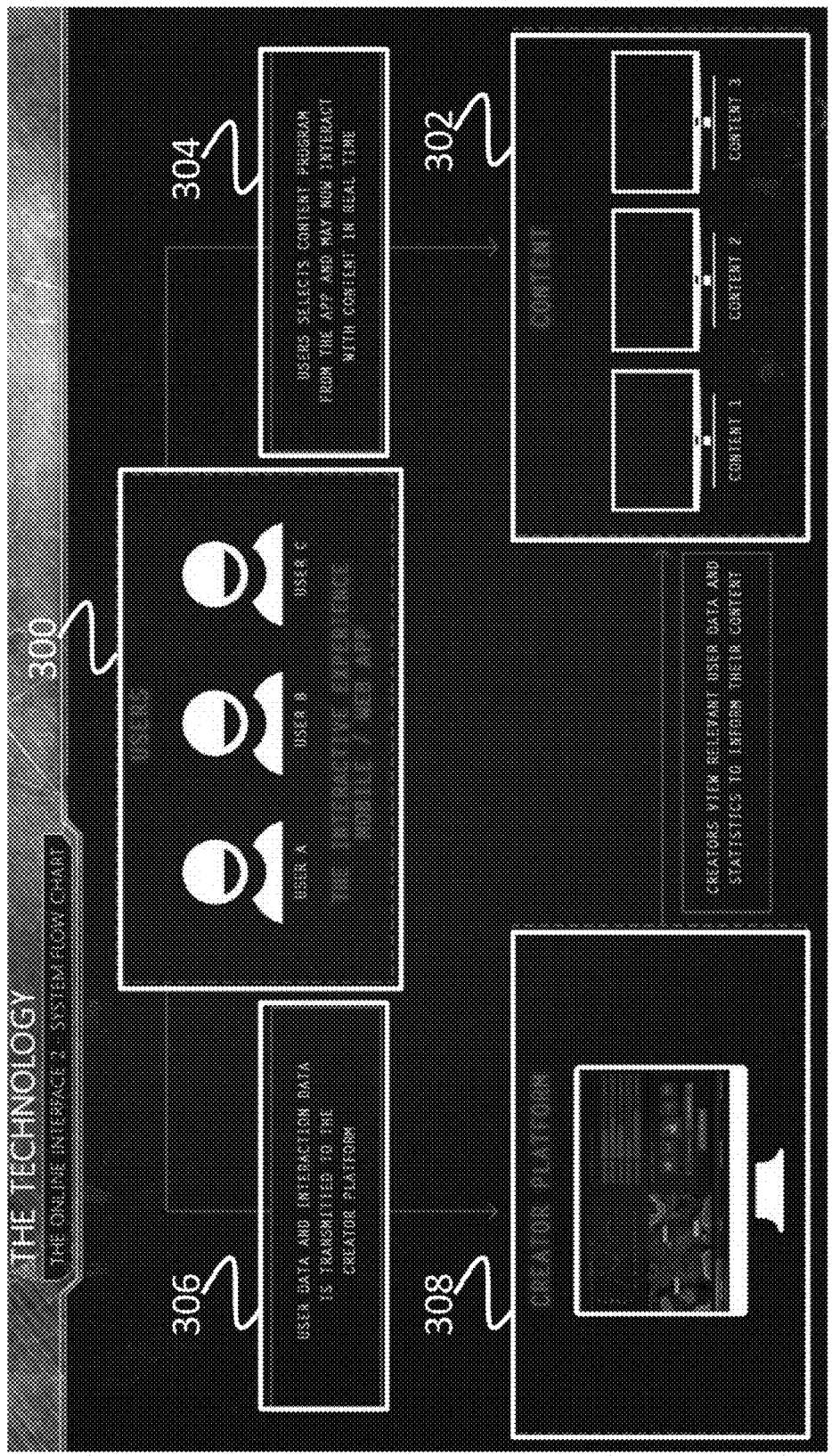
FIG. 3 is an example flow diagram of a system and method for managing interactive media, according to some example embodiments.

FIG. 3 illustrates an example flow diagram of a system and method for managing interactive media, according to some embodiments of the present invention. As shown in FIG. 3, at block 300, users may interact with an interactive media application (e.g., the interactive media application 110) operating on a personal electronic device (e.g., electronic device 112) while consuming media content 302. At block 304, users may select the interface for particular media content, such as a television show, and interact with the content, and/or the content creators, in real time during the broadcast of the media content.

Further details of examples of interactions according to some embodiments of the present invention will be described in more detail below. As the users interact with the interactive media application, data about the users, including their profile information (e.g., age, gender, location, and the like), along with their preferences or answers to various functions (e.g., prompts, polls, or questions, etc.), may be transmitted, as illustrated at block 306, to a media content creator (e.g., media content creator 102). According to some embodiments, the data about the users may be transmitted by way of a data communication network (e.g., a public Internet, cellular data network, and the like) using any suitable data communication channel to a hub or backend platform configured to receive, process, aggregate, and transmit user data. For example, the user data may be transmitted to an interactive media server 108 operating as a cloud-based platform for facilitating the collection, aggregation, and exchange of information between users and media content creators. At block 308, the media content creators may view the data about the users by way of a creator platform or interface operating on a local electronic device or computer system, and based on the user data, may modify or adjust the media content in real time during the broadcast, performance, or distribution platform (e.g., concert, live performance, etc.).

FIGS. 4A-4I illustrate examples of a user interface of an interactive media application for media content consumers, according to some examples of the present invention. As discussed above, according to embodiments of the present invention, users (e.g., consumers of media content) may operate an electronic device 112 configured to operate an interactive media application 110. According to some embodiments, the electronic device 112 may be in electronic communication with the interactive media server 108, which may transmit the interactive media application 110 to the electronic device 112 for installation and display thereon.

Figure 4A:
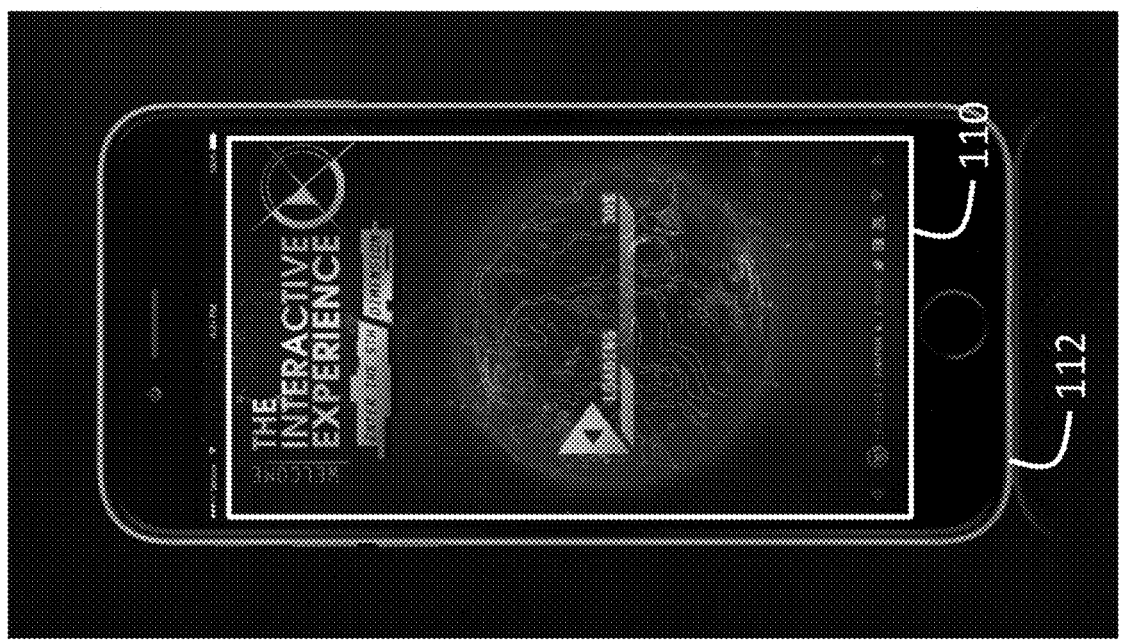
Figure 4C:
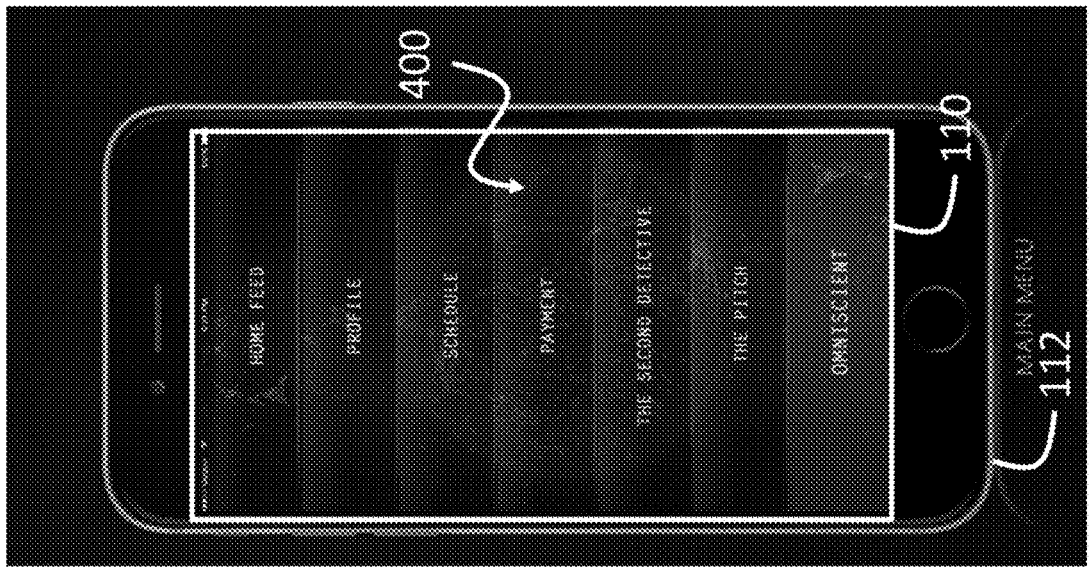
Figure 4B:

As shown in FIG. 4B, the interactive media application 110 may include an interface for establishing a user account, and authenticating or logging into the user account, by comparing a username and/or password with user information stored on the interactive media server 108 and/or the electronic device 112. Additionally, according to some embodiments, users may be enabled to establish and authenticate their user account based on a user profile hosted by a third party application, such as a social networking website.

As illustrated in FIG. 4C, the interactive media application 110 may include an interface 400 for managing a user account or profile. According to some embodiments, the interface 400 for managing the user account profile may be accessed only after the identity of the user has be authenticated as discussed above with respect to FIG. 4B. The interface 400 may include one or more selectable areas or buttons for navigating the interactive media application. For example, the interface 400 may include a selectable area for navigating to a home feed, discussed in more detail below, where users can view relevant news related to media content in which they are interested, or interact with other users or media content creators regarding various media content.

The interface 400 may also include selectable areas for editing or modifying user profile information or payment methods. Further, the interface 400 may include a selectable area for viewing the project schedule of one or more media content projects in which the user is interested.

Additionally, the interface 400 may include one or more selectable areas for navigating to windows or sub-interfaces that are specific to different types of media content. For example, in the case where the user is interested in various interactive television shows, the interface 400 may include selectable areas or buttons corresponding to the window or sub-interface for the interactive platform corresponding to each television show. Of course, as discussed above, embodiments of the present invention are not limited to television shows and may include various other media content as described above.

Figure 4E:
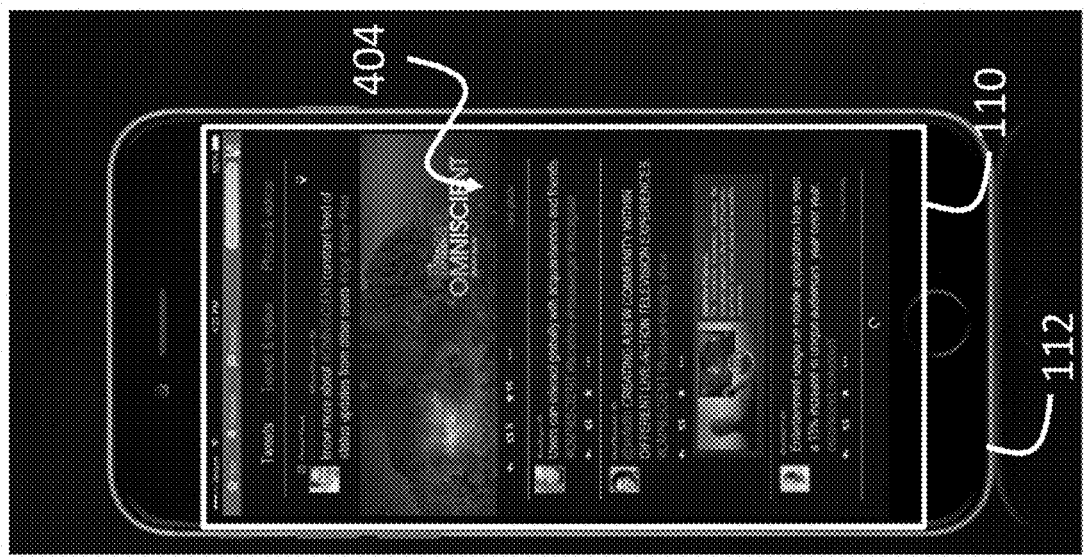
Figure 4D:

FIG. 4D illustrates an example of a user profile sub-interface 402 according to an example embodiment of the present invention. For example, the user profile sub-interface 402 may include various editable fields where users can supply information about themselves, such as their picture, contact information, location, username, friends or connections, media content they are interested in, and the like.

FIG. 4E illustrates an example of a news feed sub-interface 404 according to an example embodiment of the present invention. According to some embodiments, the news feed sub-interface 404 may include an interface for exchanging messages with other users or media content creators, and additionally may include information from media content creators transmitted to the interactive media server 108 for display on users' news feed sub-interface.

Figure 4F:
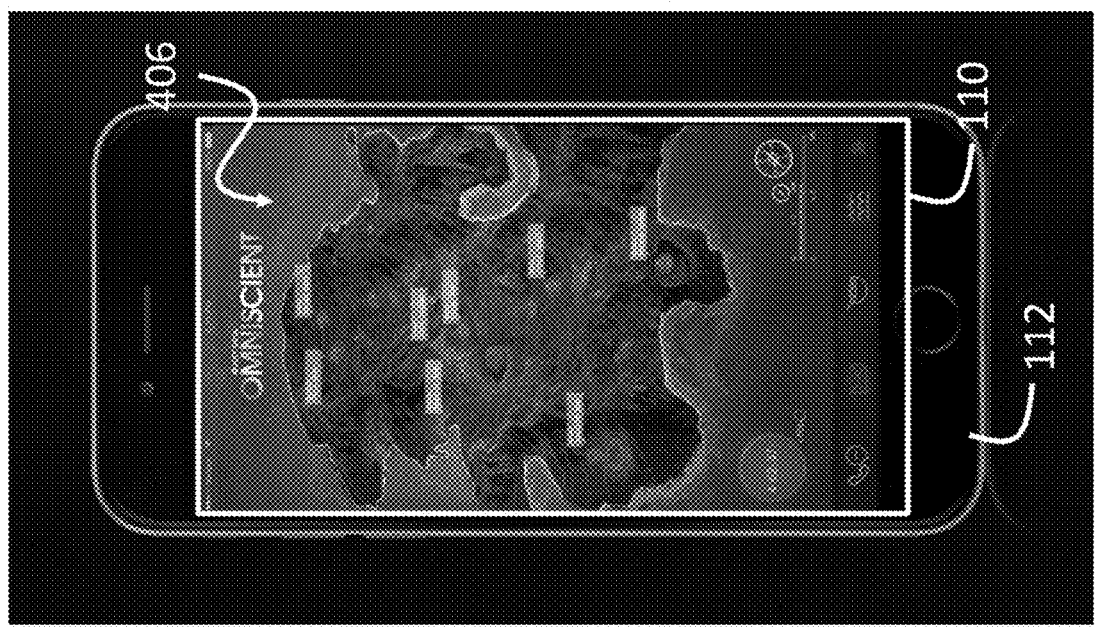

FIG. 4F illustrates an example of a media content sub-interface 406 according to an example embodiment of the present invention. For example, according to some embodiments, the media content corresponding to the media content sub-interface 406 may be a reality competition show in which users may influence the outcome or progression of the show in real time by responding to polls or voting regarding obstacles or competitions for the subjects of the reality competition show. For example, the media content sub-interface 406 may include a map of a competition area, with various selectable options for voting on obstacles or challenges, or icons illustrating the locations and/or status of competitors.

Figure 4G:

Additionally, as illustrated in FIG. 4G, media content creators may pose polls or questions to users, such as whether to impose an obstacle on the competitors, or the type of obstacle or event that should occur. Such questions may be displayed, for example, on the media content distribution platform 104 during a live broadcast of the media content, or on the electronic device 112 by way of the interactive media application 110, and the users can respond to or interact with the question using the interactive media application 110. The interactive media application 110 then receives the user selection or input and transmits the user input to the interactive media server 108. The interactive media server 108 may process or aggregate user input from a plurality of users providing user input, and transmit information about the user input to a media content creator interface (discussed in more detail below), thereby enabling media content creators to receive user input and adjust or modify the media content based on the user input.

Figure 4H:
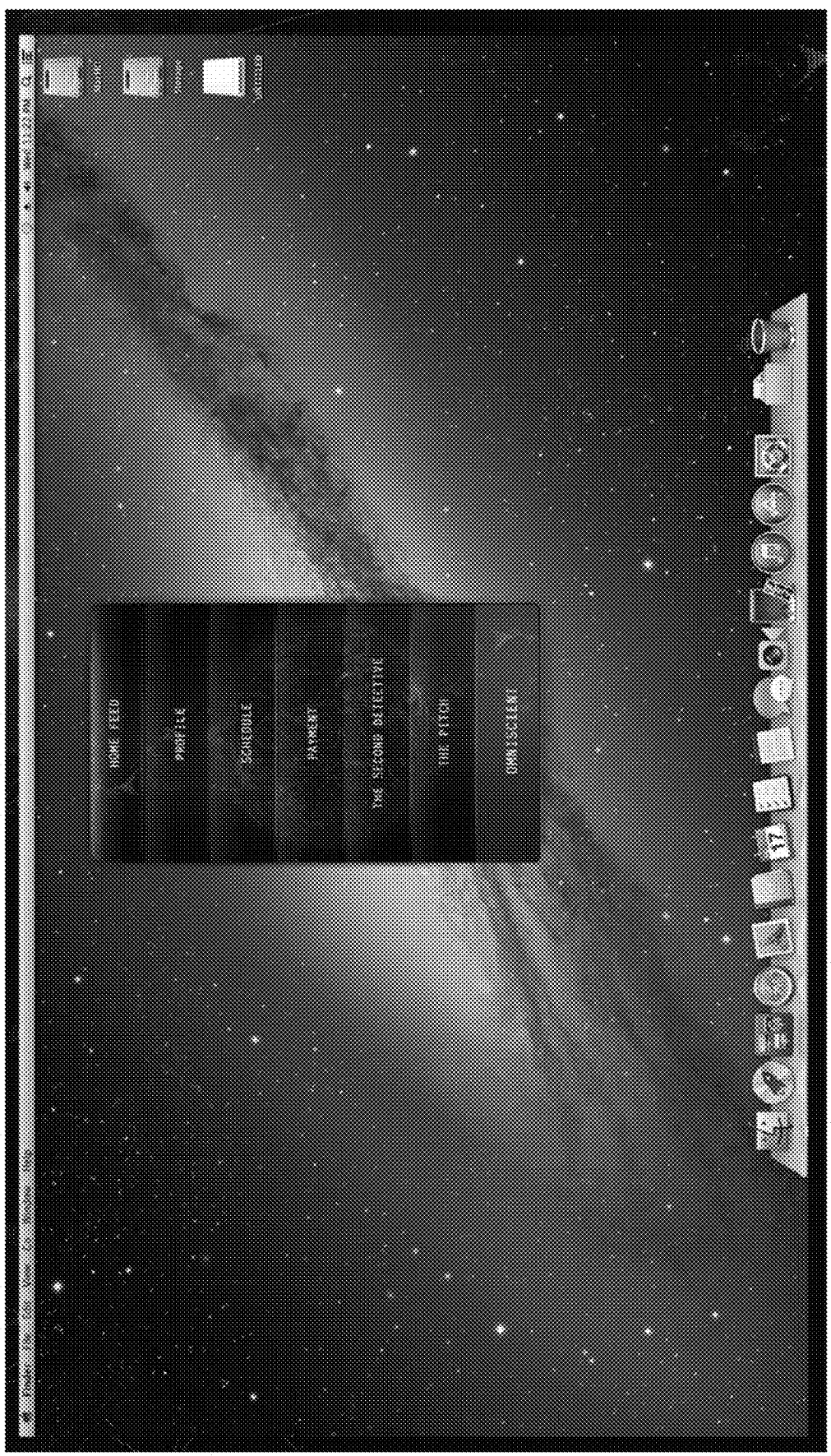
Figure 41:

As shown in FIGS. 4H and 4I, according to some embodiments, the interactive media application 110 may be displayed as a widget or layer that overlaps a user interface for other applications (such as a computer desktop or Internet browser window).

FIGS. 5A-5E illustrate examples of a user interface of a media content creator interface 500, according to some example embodiments of the present invention. According to some embodiments of the present invention, the interactive media management system 100 may operate as a scalable platform-as-a-service, enabling media content creators to easily incorporate the functionality and features of the interactive media management system 100 with the media content that they produce.

Figure 5A:
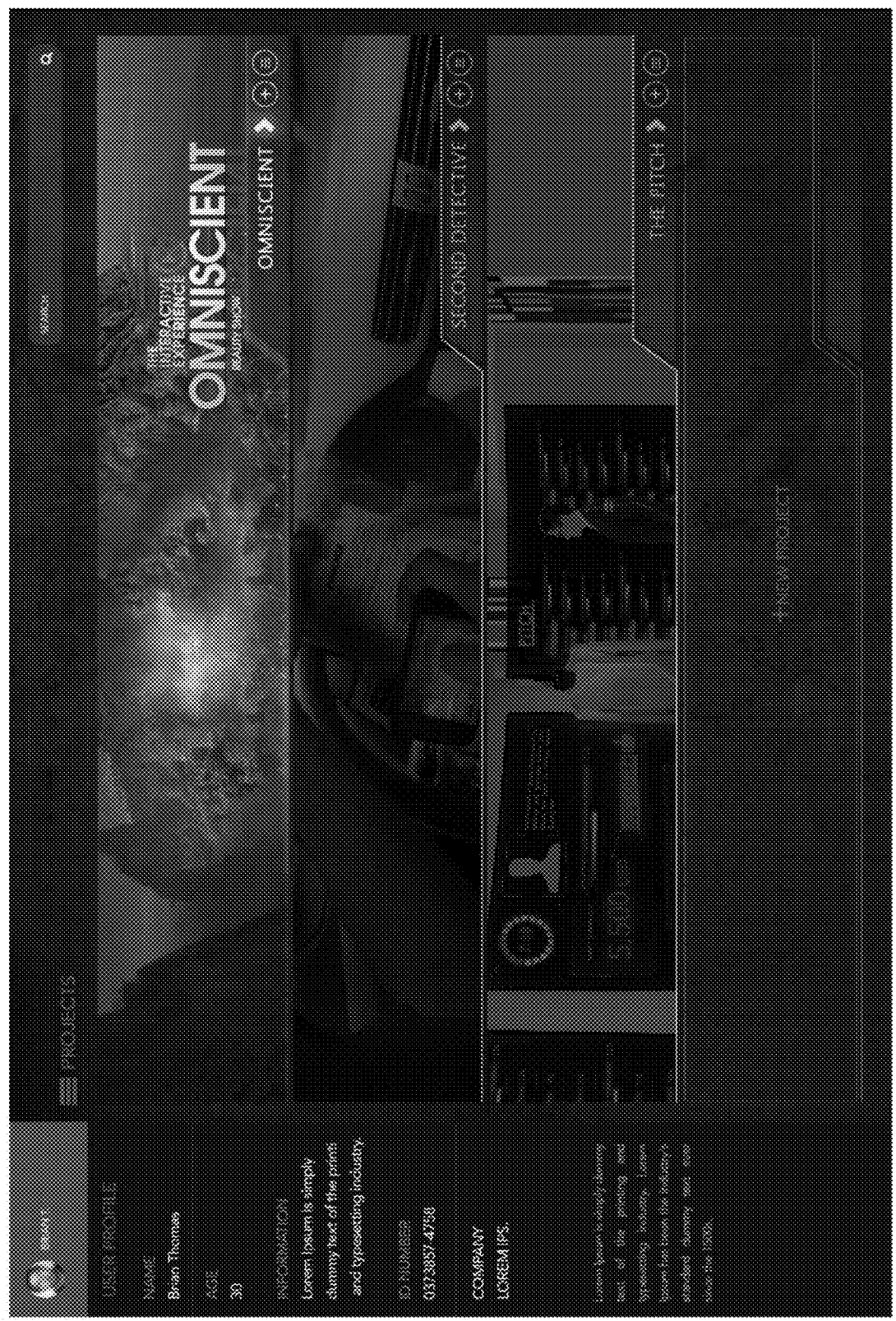
FIGS. 5A-5E illustrate examples of a user interface of a media content creator interface, according to some example embodiments of the present invention.

As discussed above with respect to the interactive media application 110, the media content creator interface 500 may include an authentication or login interface for authenticating the identity of the media content creator. Additionally, the media content creator interface 500 may include a sub-interface for selecting a particular media content project to view information about the particular media content, as shown in FIG. 5A. For example, a media content creator may be involved with multiple distinct projects operating as part of the interactive media management system 100.

Figure 5B:
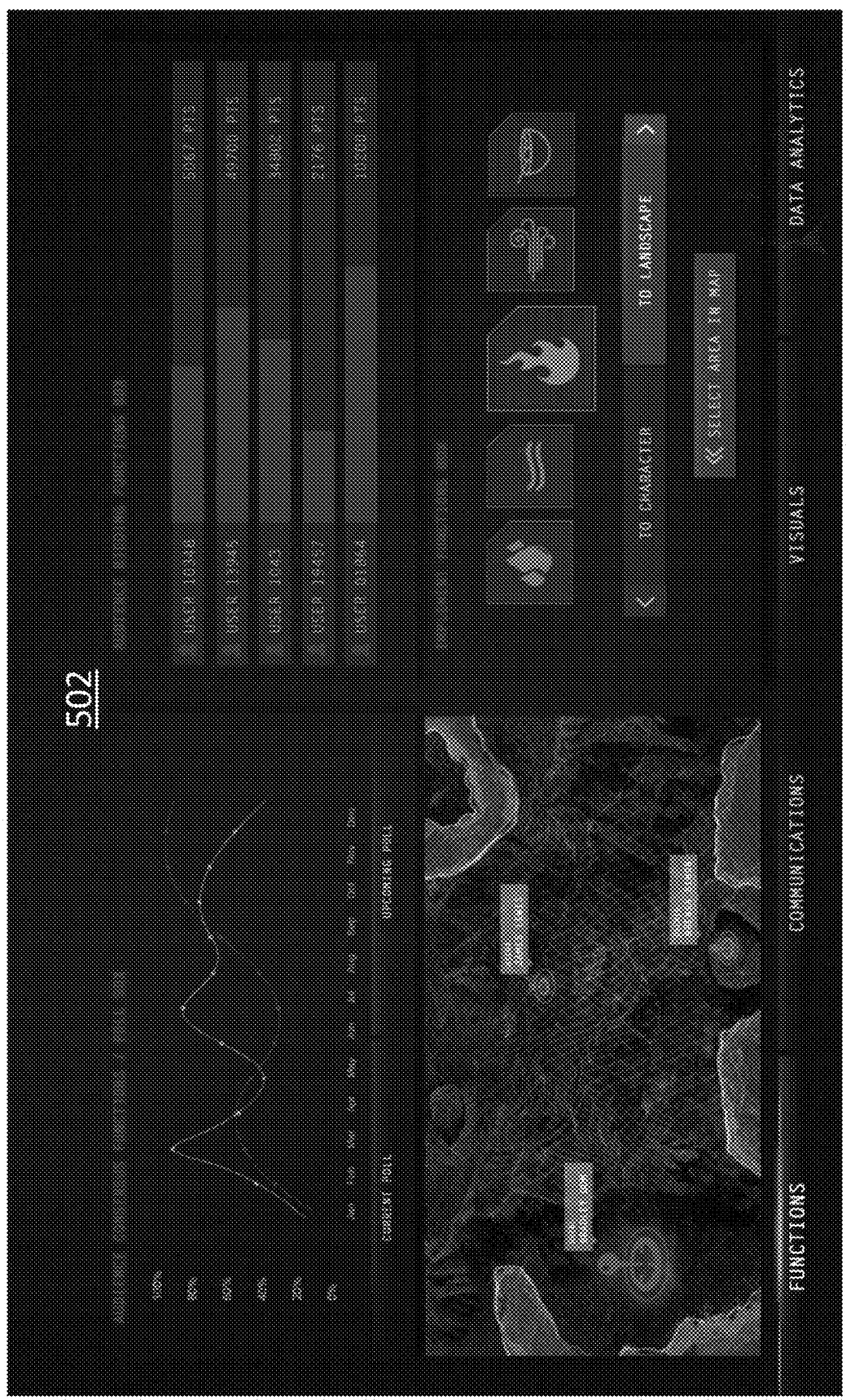

In response to a media content project being selected, the media content creator interface 500 may display a project sub-interface 502, as illustrated in FIG. 5B, for managing interactions with users (e.g., media content consumers or viewers), communicating with other members of the media content creator team, viewing user information, and coordinating changes in the direction or progression of the media content in real time during a broadcast in response to user input.

For example, as illustrated in FIG. 5B, the media content creator interface may display various icons or graphical buttons for selecting features or events to occur during the media content broadcast. In the context of a reality contest show, for example, selection of such icons or graphical buttons may cause certain obstacles or rewards to confront the contestants. Additionally, the interface 500 may display a map or visual representation of the media content to enable the media content creator to select the location where an obstacle or reward may appear.

The interface 500 may also display information about user votes or answers to questions or polls presented to viewers. For example, the media content creator may issue a poll to be displayed on the interactive media application 110 of each of the active users, asking the users whether they would like one or more events to occur as part of the media content. The interactive media server 108 may receive user responses entered by users in their interactive media application 110, and aggregate the responses for display in the interface 500 (e.g., as illustrated in the upper left quadrant of FIG. 5B). According to some embodiments, responses from users who are more active than other users may be given greater weight. For example, according to some embodiments, as users (e.g., media content consumers or viewers) may acquire points as they interact with media content, and user input may be weighted according to the number of points.

In response to receiving the user input by way of the interface 500, media content creators may then utilize the interface 500 to control or modify the media content directly through the interface 500 or interact with other members of the media content creation team to coordinate changes or modification to the media content in real time during broadcast of the media content.

Figure 5C:
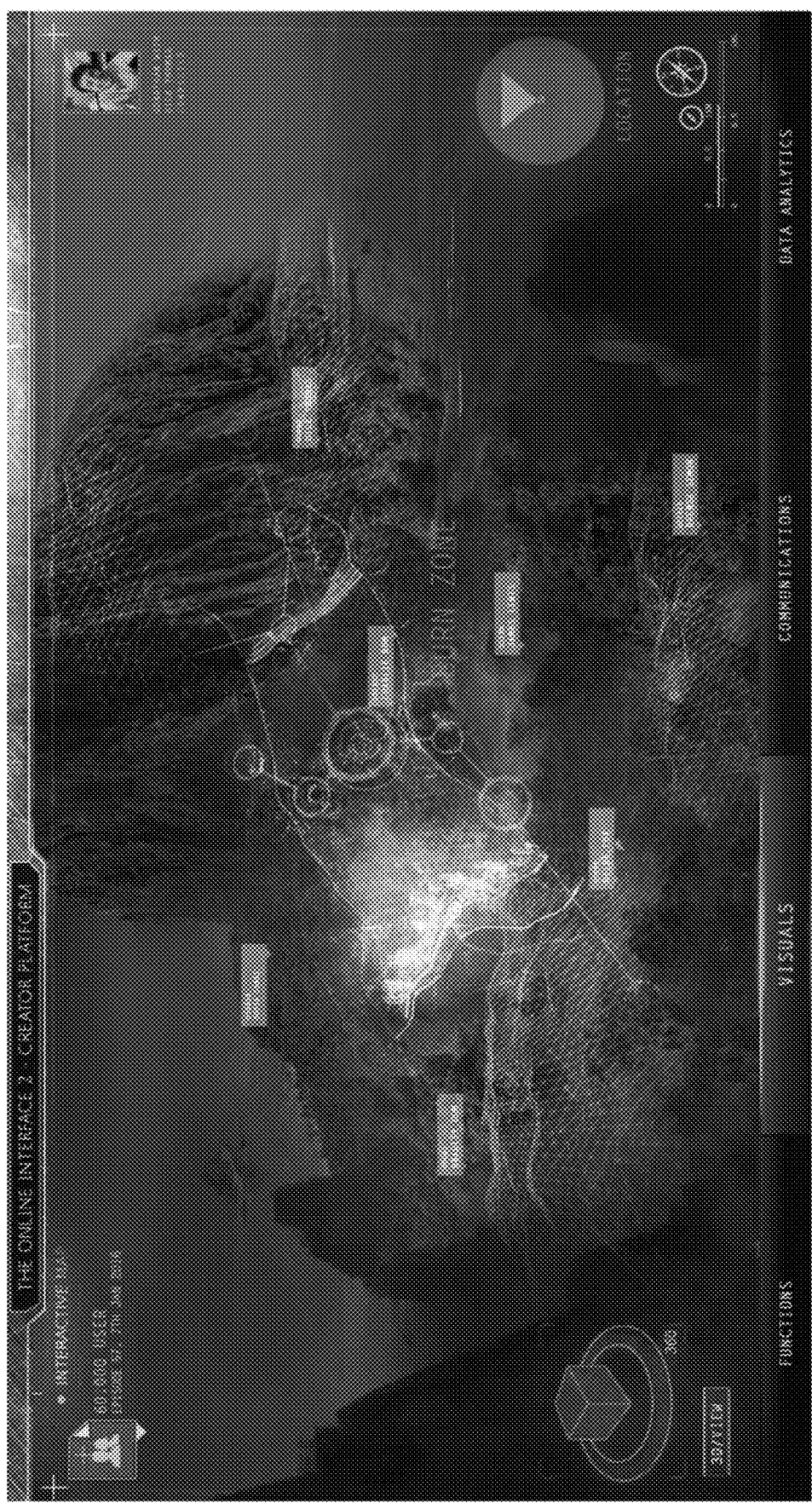

For example, as illustrated in FIG. 5C, the interface 500 may be configured to select various areas on a stage or set, and indicate where events should occur. Additionally, the interface 500 may illustrate the location of various elements or participants of a media content broadcast in real time.

Figure 5D:
Figure 5E:

As illustrated in FIGS. 5D and 5E, the interface 500 may also display various data analytics information relevant to the management of the media content production, such as a summary or aggregation of user input, the size or behavior of the media content audience, the location of audience members, the number of active users, information about characters or participants in the media content, and the like.

Figure 6A:
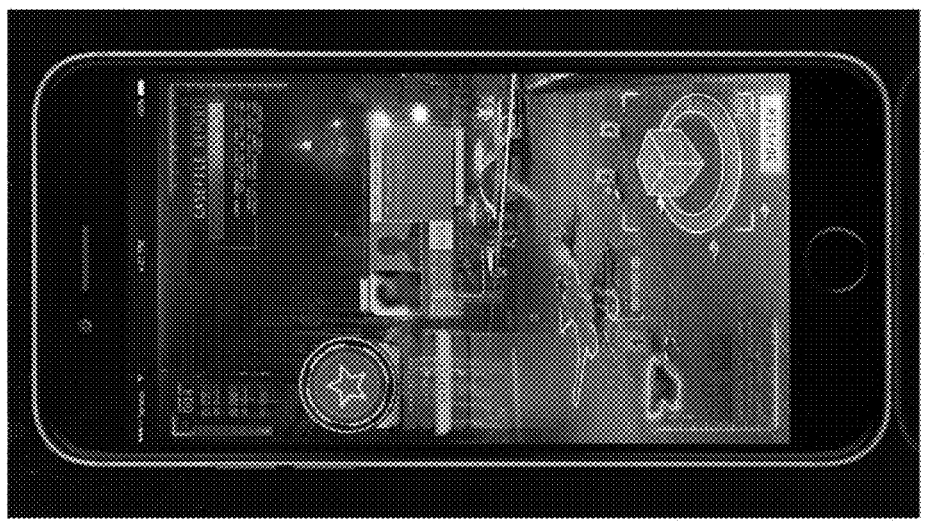
FIGS. 6A-6D illustrate examples of a user interface of an interactive media application for media content consumers, according to some examples of the present invention.
Figure 6B:

FIGS. 6A-6D illustrate examples of a user interface of an interactive media application for media content consumers, according to some examples of the present invention. FIG. 6A illustrates an example user interface (e.g., as part of the interactive media application 110) for interacting with a crime television show. For example, as shown in FIGS. 6A and 6B, users may be presented, during a media content broadcast, with a scene or image related to the media content being broadcast. Users may be enabled to explore aspects of the scene or select and/or manipulate objects, characters, or events in the scene to influence the direction of the live broadcast. In the context of a crime television show, for example, users may be presented with an image of a crime scene within the user interface, with different objects or characters in the scene. Users may then select one or more objects or characters to influence whether a character in the media content broadcast performs some action relating to the object or character, such as exploring a piece of evidence in more detail.

Figure 6D:
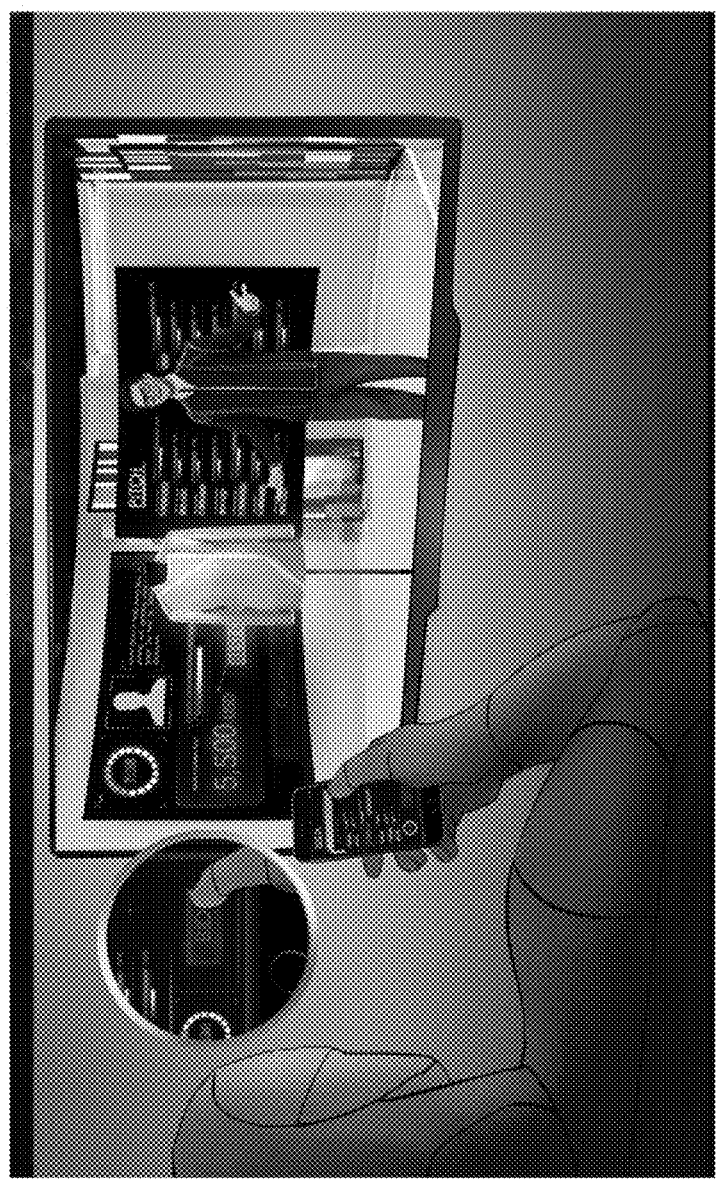
Figure 6C:
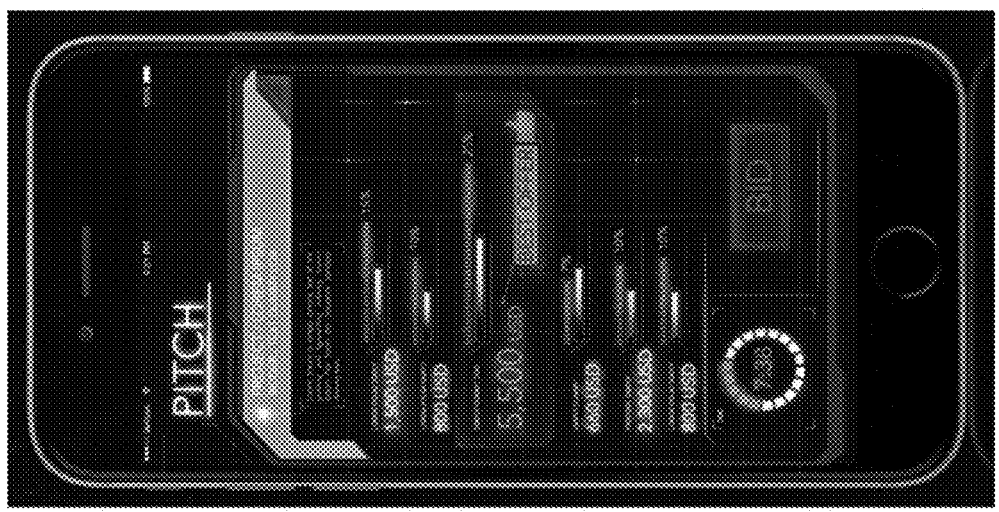

In the same way, in the context of a media content broadcast related to investing in businesses or purchasing products, users may be able to submit offers to presenters in the program to invest in the presenter's company or purchase a product from the presenter, as shown in FIGS. 6C and 6D.

Figure 7B:
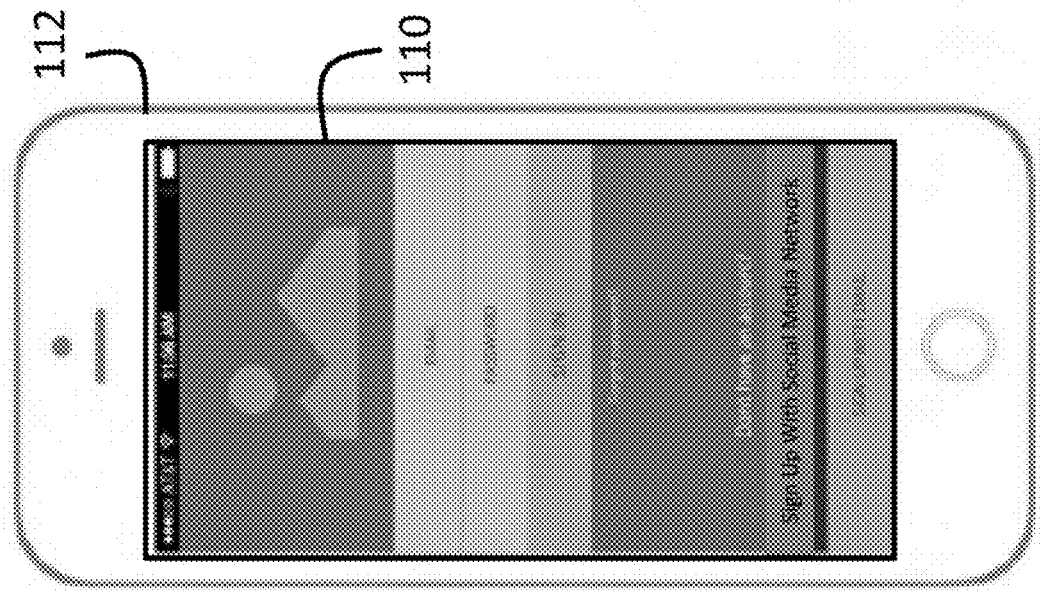
FIGS. 7A-7U illustrate an example user interface for consumers to interact with a media content broadcast, according to some example embodiments of the present invention.
Figure 7A:
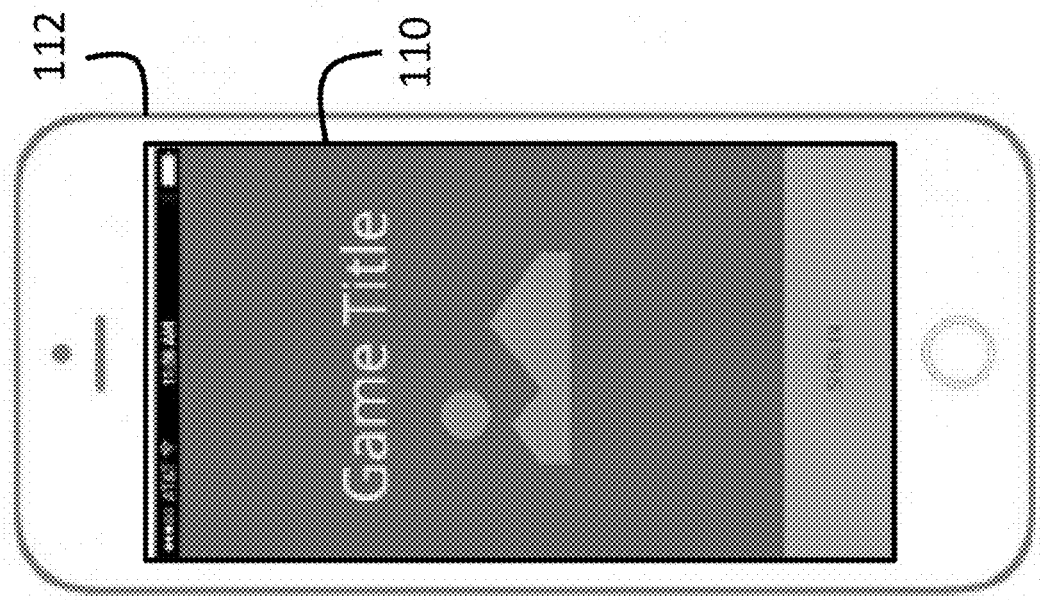

FIGS. 7A-7U illustrate an example user interface for consumers to interact with a media content broadcast, according to some example embodiments of the present invention. In contrast to the user interface of the interactive media application 110 as illustrated in FIGS. 4A-4I, which illustrate the interactive media application 110 in the context of a Platform-as-a-Service (Paas) system, the interactive media application 110 in FIGS. 7A-7U is illustrated in the context of a standalone application for a particular media content production. Embodiments of the present invention, therefore, may be utilized in some instances for providing a standalone user interface for facilitating interactive engagement with a specific media content production. Additionally, according to some example embodiments, the interactive media management system 100 may be utilized to provide a PaaS user interface for a plurality of media content productions, for example, in which various different media content producers may leverage the interactive media management system 100 to facilitate interactive engagement by users for their individual media content productions.

Referring to FIG. 7A, as discussed above, according to embodiments of the present invention, users (e.g., consumers of media content) may operate an electronic device 112 configured to operate an interactive media application 110. According to some embodiments, the electronic device 112 may be in electronic communication with the interactive media server 108, which may transmit the interactive media application 110 to the electronic device 112 for installation and display thereon.

As shown in FIG. 7B, the interactive media application 110 may include an interface for establishing a user account, and authenticating or logging into the user account, by comparing a username and/or password with user information stored on the interactive media server 108 and/or the electronic device 112. Additionally, according to some embodiments, users may be enabled to establish and authenticate their user account based on a user profile hosted by a third party application, such as a social networking website.

Figure 7D:
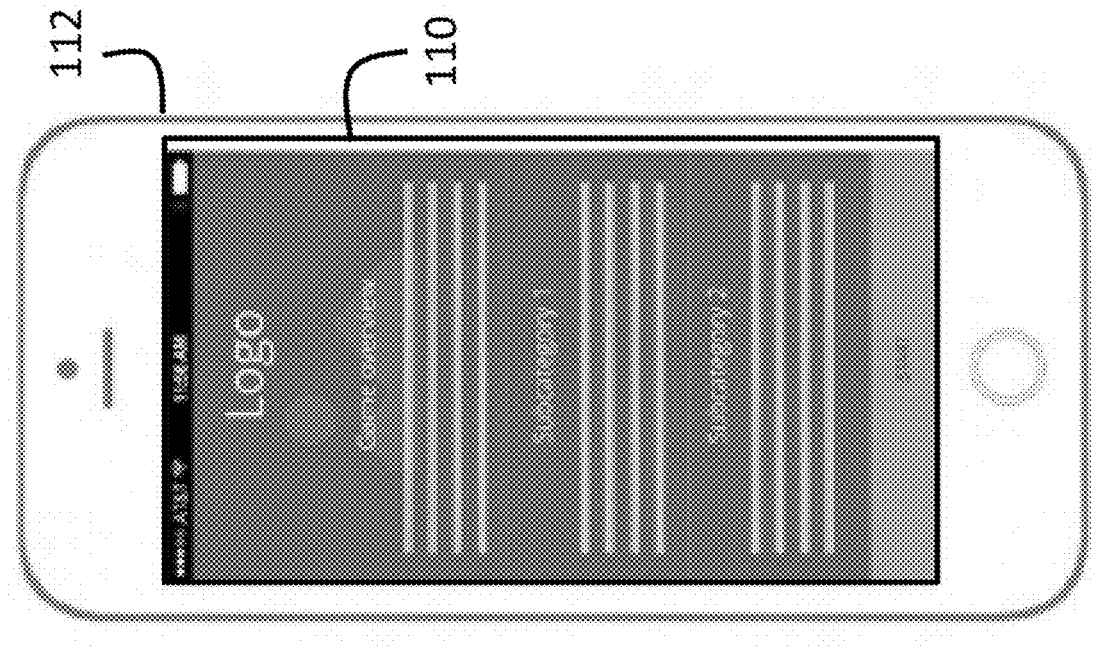
Figure 7C:
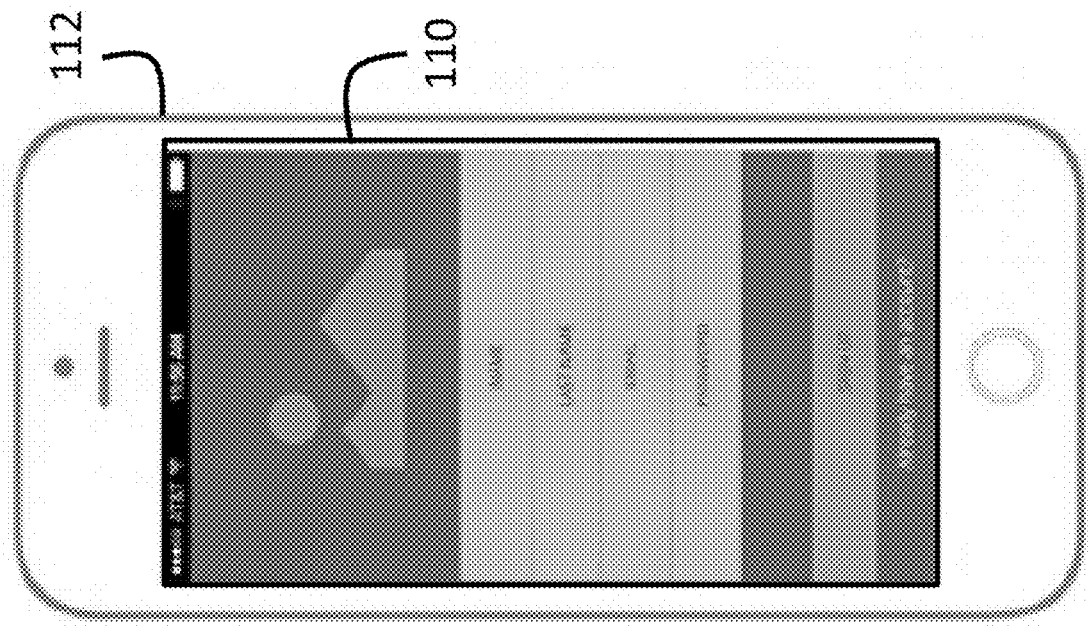

As shown in FIG. 7C, the interactive media application 110 may include an interface for establishing a user account by entering, for example, a username or email address, a password, biometric data, and/or any other personal identifying information to be stored as user information on the interactive media server 108 and/or the electronic device 112. When logging in or connecting to the application, the user can authenticate their identity using, for example, the interface illustrated in FIG. 7B to provide the authenticating identity information to be compared against user information stored in the interactive media server 108 and/or the electronic device 112.

According to some example embodiments, as illustrated in FIG. 7D, the interactive media application 110 may include an interface for displaying information about the media content production, which may be displayed, for example, after a user logs into the interactive media application 110.

Figure 7F:
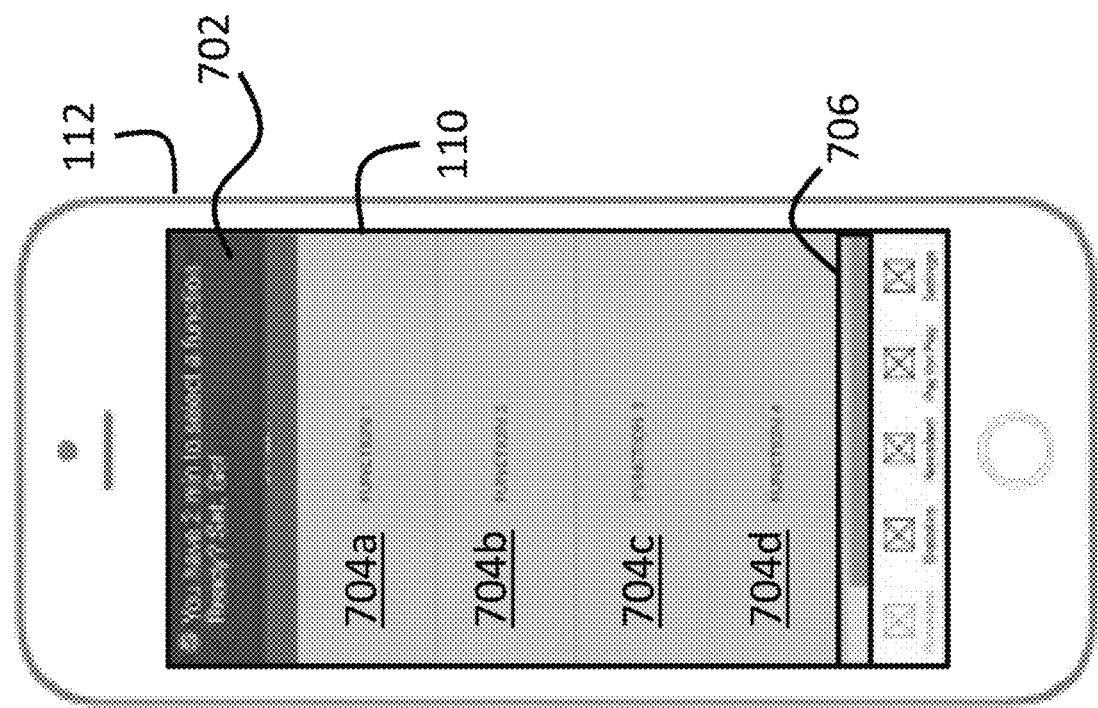
Figure 7E:
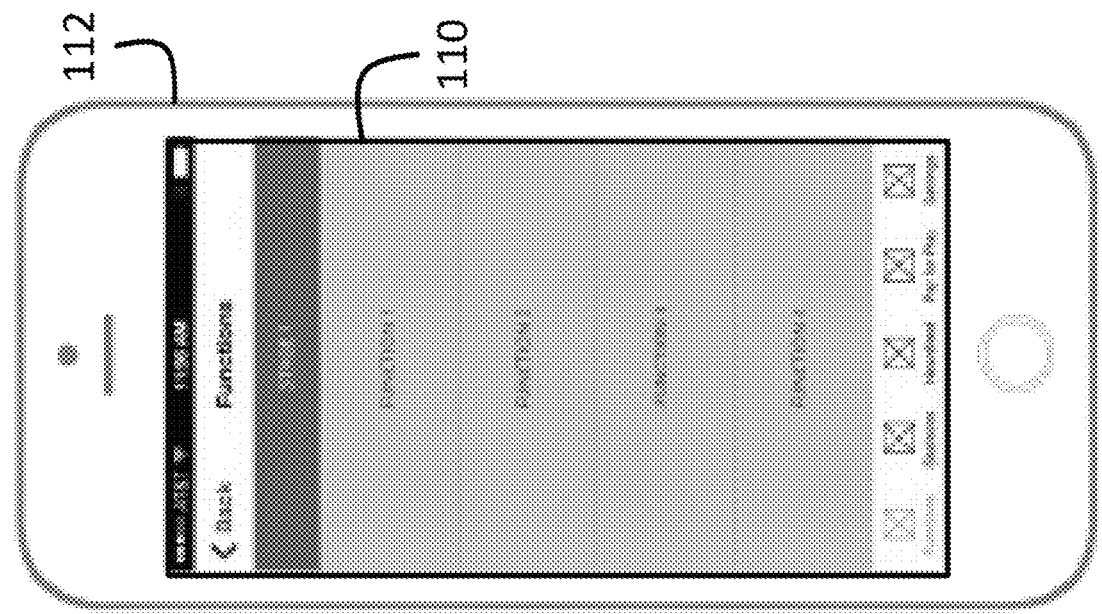

According to some example embodiments, as illustrated in FIG. 7E, the interactive media application 110 may include an interface for enabling users to vote on one or more functions or actions to be executed during the course of a live or ongoing media content production. According to some embodiments, a live or ongoing media content production may be divided into two or more stages or segments. Such segments may be divided differently according to the nature of the media content production.

For example, for the purposes of illustration, assume that a media content production is a television production involving contestants or participants traversing through a haunted house. In such instances, each room of the haunted house may be defined as a separate stage, for which viewers or users of the interactive media application 110 can vote to have one or more functions or actions occur while contestants pass through the room. For each room or stage, the media content producers may predetermine a plurality of various functions or actions that may be executed while the contestants pass through the room, such as screaming sounds, monsters emerging from hidden passages, and the like. As another example, the stages may be segmented by time (e.g., each stage has a predetermined duration), geographic location of characters or participants in the television production, or any other suitable division of segments or portions of a media content production according to the nature of the production.

For each stage, each user interacting with the interactive media application 110 can vote on or select which function, from among the plurality of optional functions, the user would like to be executed. As will be illustrated in further detail below, the users' selections are transmitted to the interactive media management system 100 and aggregated. Media content producers can then access a corresponding user interface accessible to the media content produces that displays the status of the user selections, and also enables the media content producers to monitor and control the execution of the functions.

As illustrated in FIG. 7F, according to some embodiments, the interactive media application 110 may be configured to display an alert or notification 702 to notify users about one or more conditions, such as time constraints, for voting on a function or action. For example, according to some embodiments, the interactive media application 110 may display a notification that the user has a predetermined time period within which the user may select from among a plurality of functions 704a-704d. The number of functions is not limited to the number illustrated in FIGS. 7A-7U, and may include any number of functions according to the design of the interactive media management system 100 and the nature of the media content production.

Additionally, as illustrated, for example, in FIG. 7F, the interactive media application 110 may be configured to display an indicator 706 for notifying users about the status of one or more conditions, such as time constraints, for voting of a function. For example, the indicator 706 may be a status bar or timer graphically indicating the amount of time remaining for selecting a function.

Figure 7G:
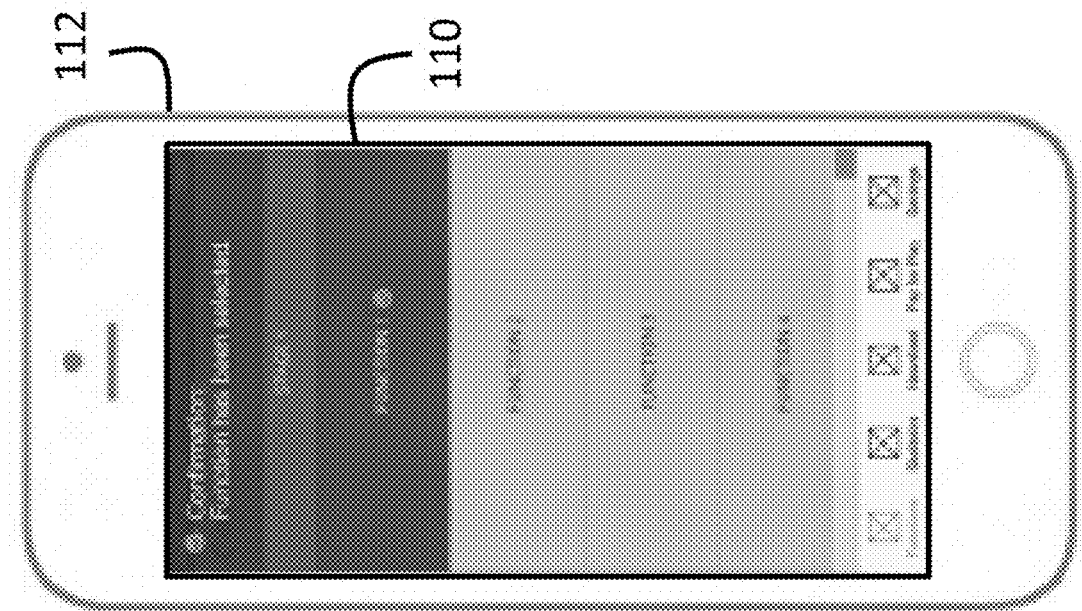

In response to a user selecting one of the functions (or an icon or button corresponding to one of the functions) 704a-704d, as illustrated in FIG. 7G, the interactive media application 110 may display a window notification 708 for confirming the user's selection. For example, the window notification 708 may include a label for indicating which function selection was detected, and one or more icons or buttons to enable to user to confirm or cancel the selection.

Figure 7H:
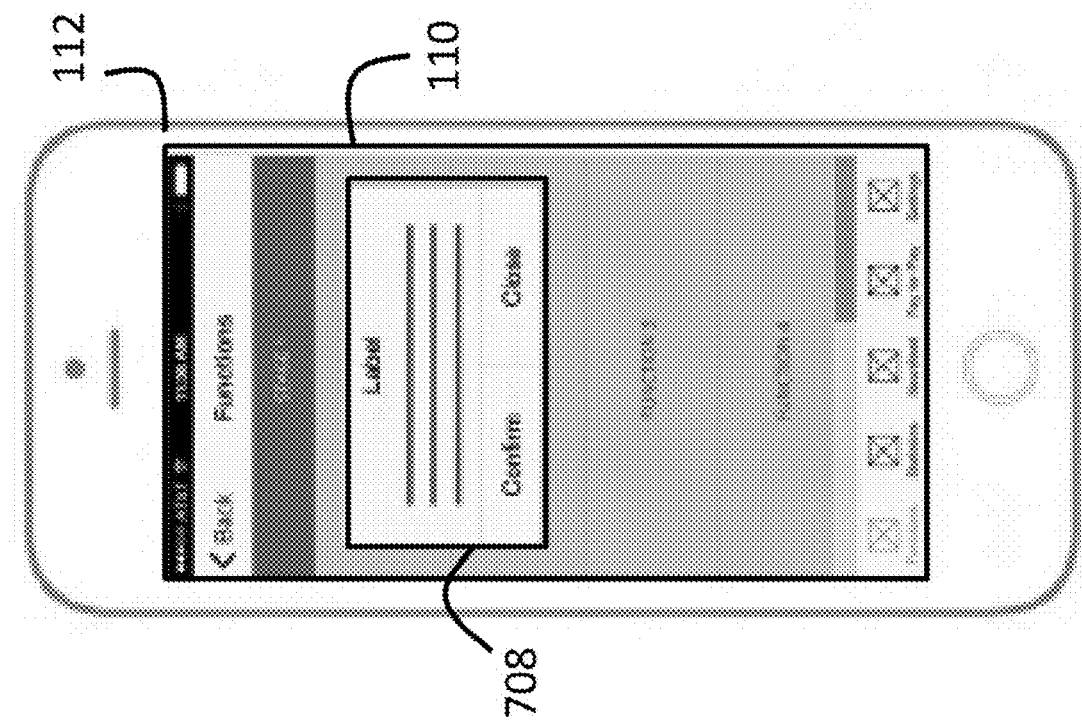
Figure 7I:
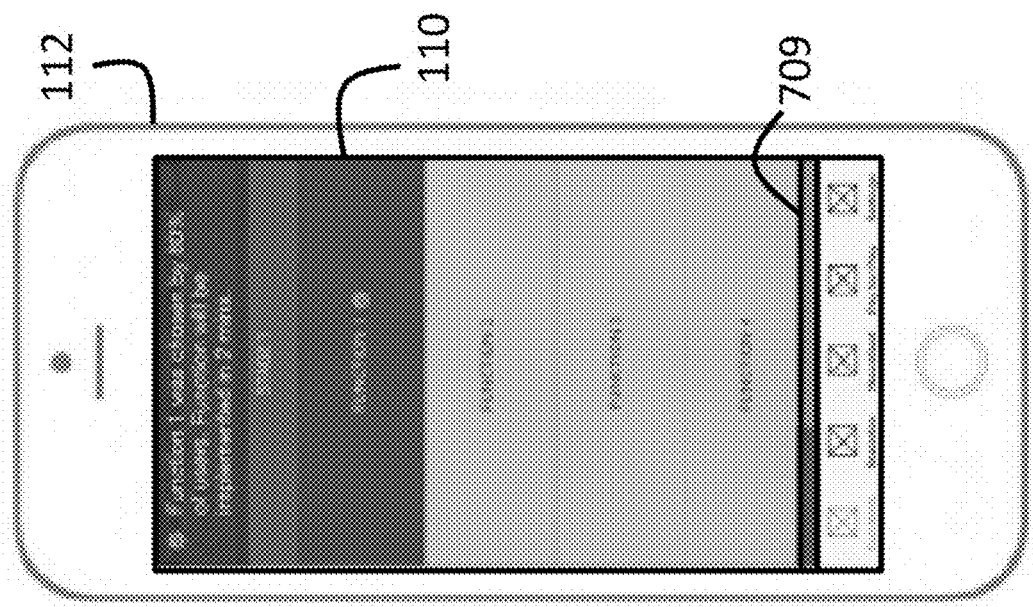

As illustrated in FIG. 7H, the interactive media application 110 may display a confirmation message to confirm the user's selection. Additionally, as illustrated in FIG. 7I, the interactive media application 110 may display one or more additional messages after each user votes. For example, after the period for voting on a function has expired, the interactive media management system 100 may display a message indicating to each user the percentage of users who voted for one or more of the possible functions. Additionally, as illustrated in FIG. 7I, the interactive media application 110 may be configured to display a status indicator 709, for example, in the form of a timer or status bar indicating the amount of time remaining until a function is implemented during a live broadcast of a media content production.

Figure 7K:
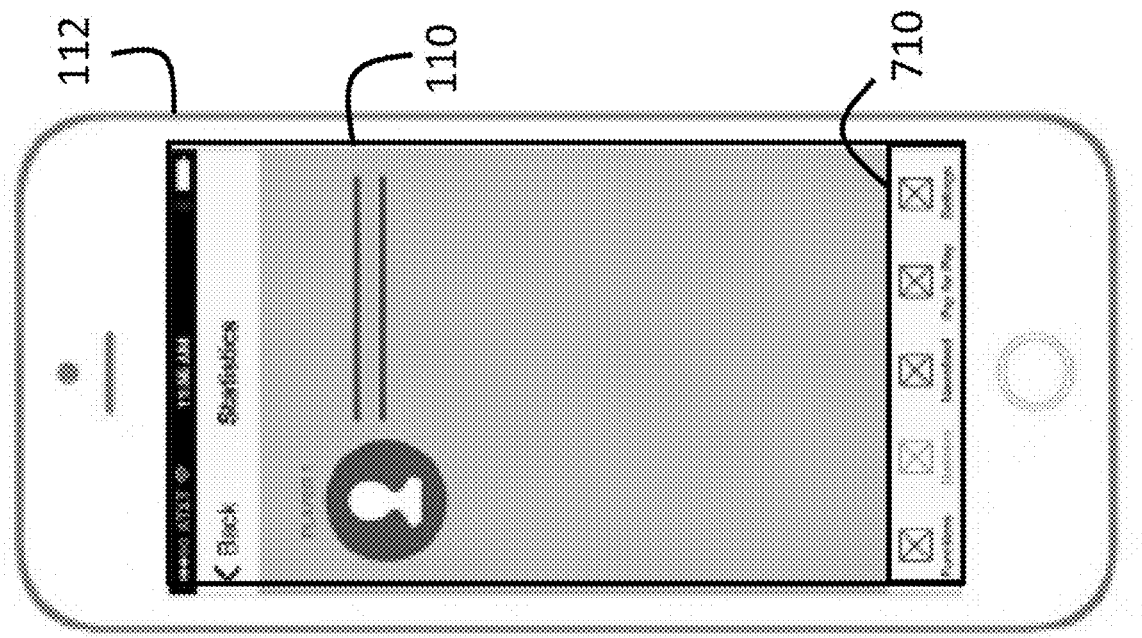
Figure 7J:
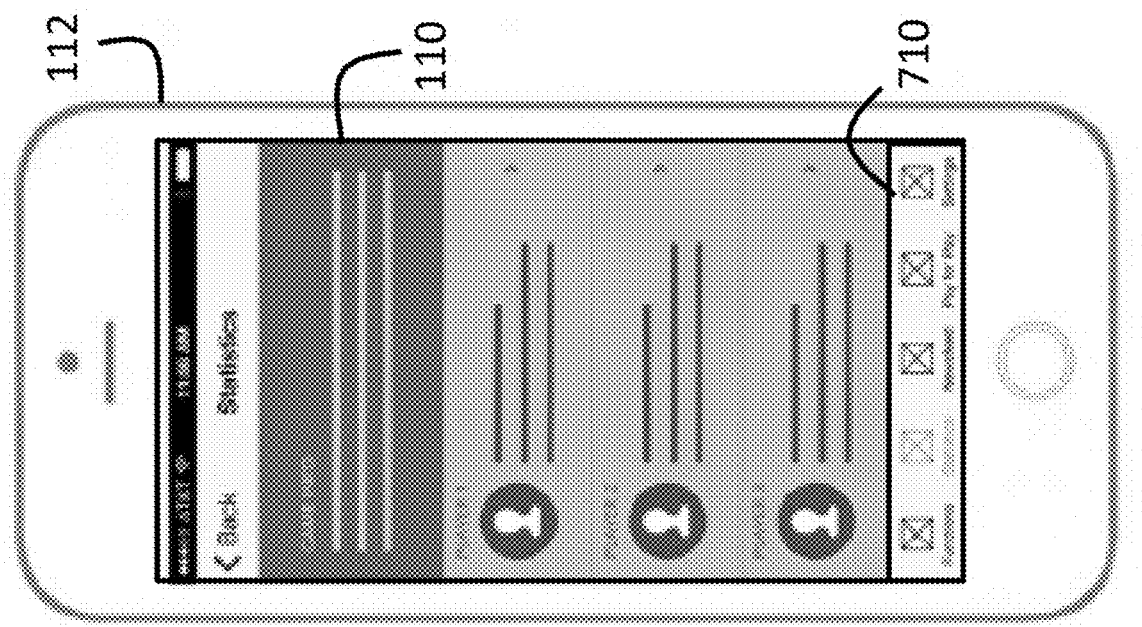

According to some embodiments, the interactive media management system 100 may further be configured, as illustrated in FIG. 7J, to display additional information about a media content production, such as background information about the media content production, or information about the characters, players, or actors in the media content production. The interactive media management system 100 may also enable users to select a player, actor, or character in a media content production to display statistical data or other information about the selected player, as illustrated in FIG. 7K.

According to some embodiments, the various different screens and graphical displays of the interactive media management system 100, for example, as illustrated in FIGS. 7J and 7K, may be displayed in response to a user selecting from among one or more navigational icons or buttons 710.

Figure 7M:
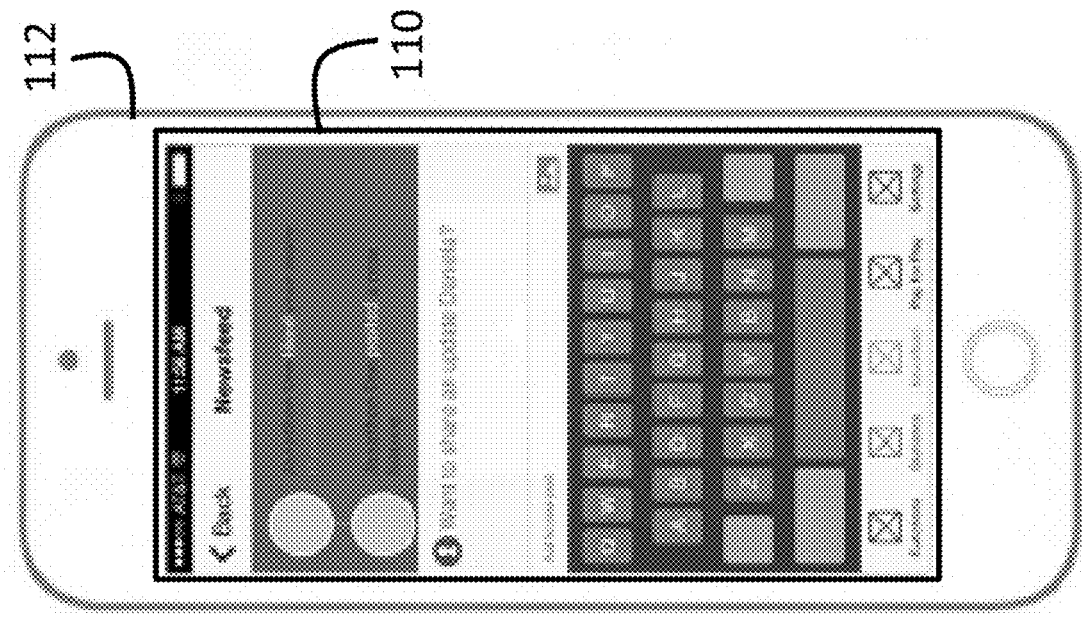
Figure 7L:
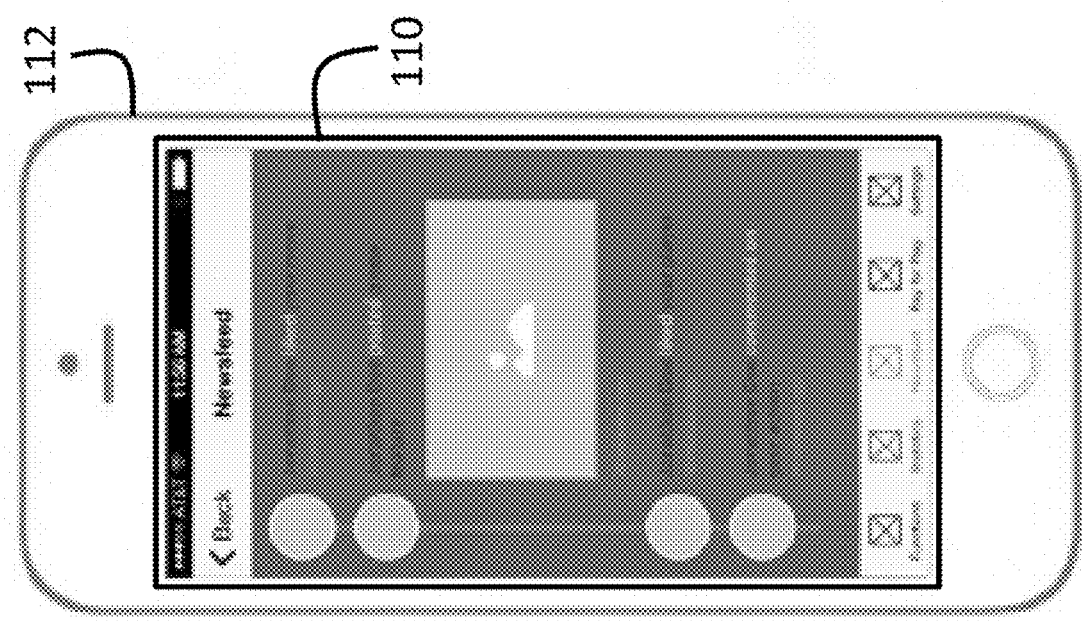

Additionally, the interactive media application 110 may be configured to display a newsfeed, as illustrated in FIG. 7L to enable users to receive real-time information about activity of other users and the ongoing live media production. As illustrated in FIG. 7M, the interactive media application 110 may include an interface to enable users to post messages to the newsfeed or to exchange messages with other users.

Figure 7N:
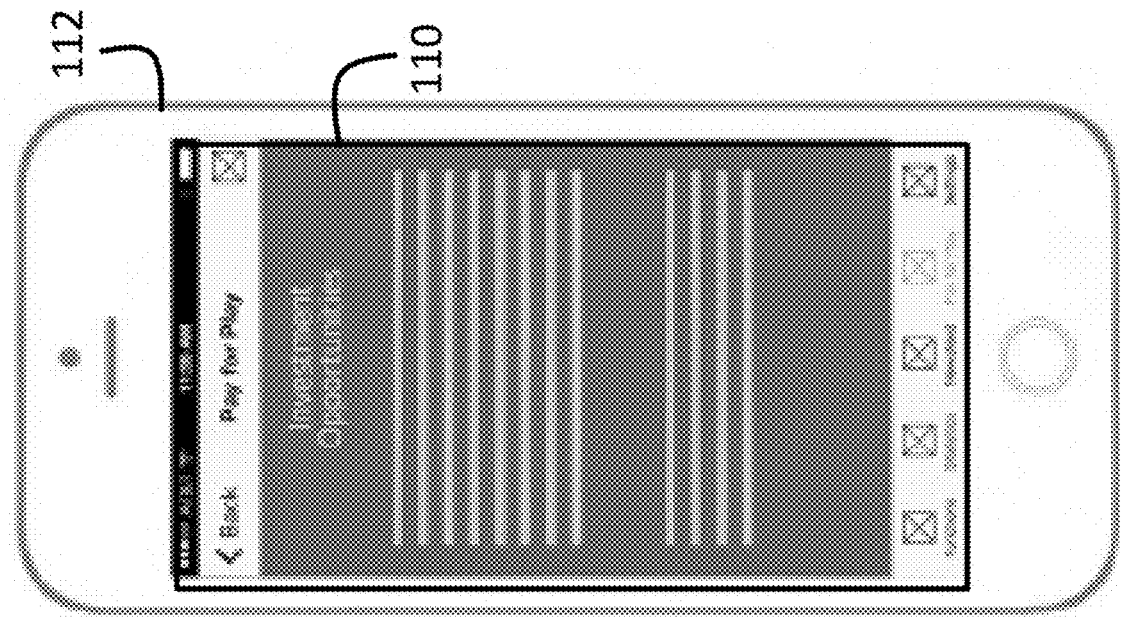
Figure 7O:
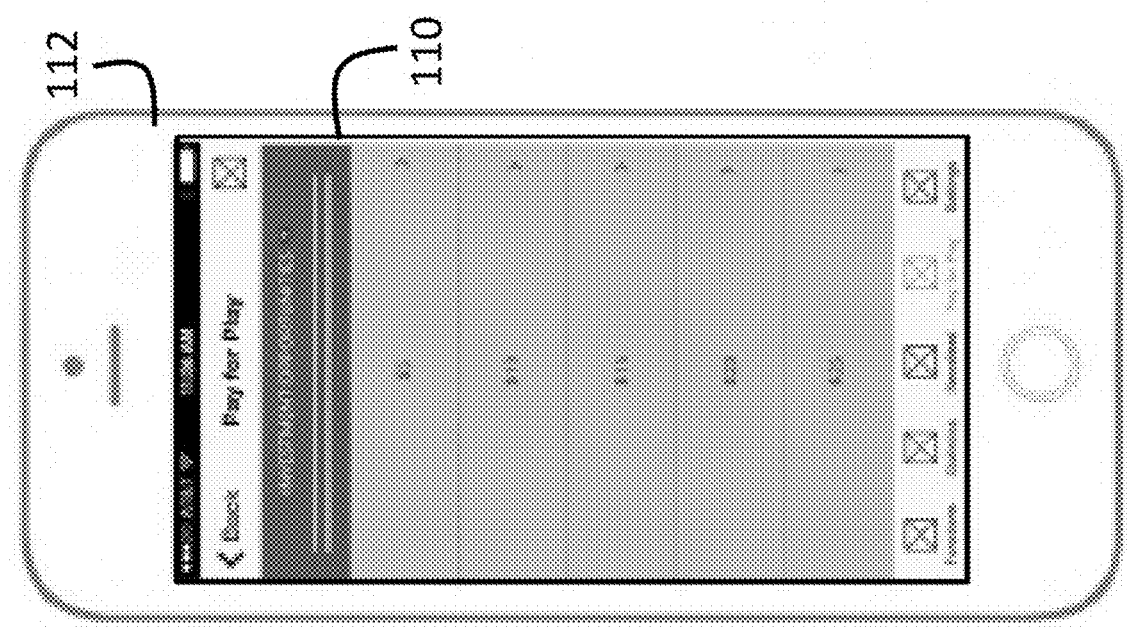

According to some embodiments, the interactive media application 110 may be configured to display an interface for enabling users to invest or contribute currency or money as part of the interactive experience. As defined herein, the term currency may include a monetary unit or medium of exchange having a monetary value (such as a block-chain or cryptocurrency) as well as points or tokens that have no monetary value. For example, during the broadcast of a media content production, a user may be enabled to invest money in the success of a particular character or participant in the broadcast. Thus, as illustrated in FIG. 7N, a plurality of icons or buttons may be displayed for enabling a user to select a payment or investment amount. Additionally, as illustrated in FIG. 7O, the interactive media application 110 may be configured to display additional information about individual investment opportunities in response to user input.

Figure 7Q:
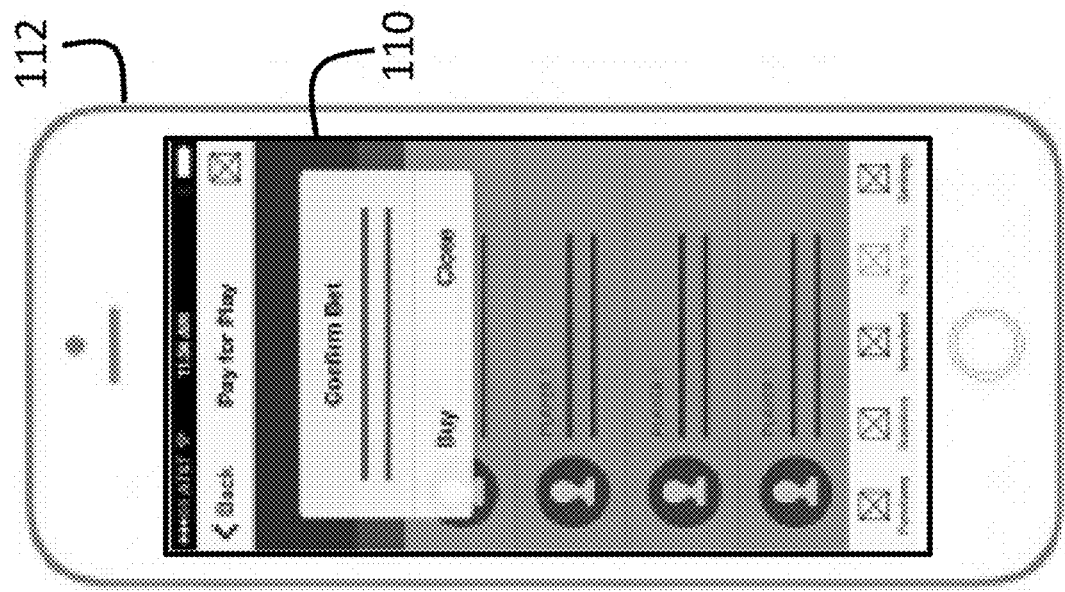
Figure 7P:
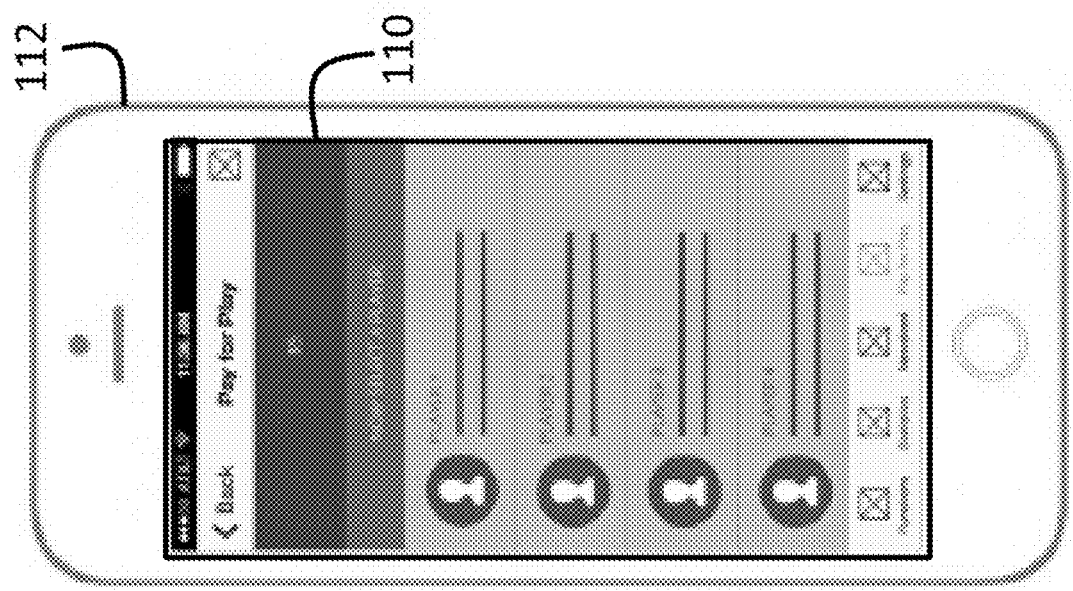

In the case that users are enabled to invest in particular players or participants in a broadcast, as illustrated in FIG. 7P, the interactive media application 110 may be configured to display an interface for enabling users to select which player or participant to invest in. Embodiments of the present invention are not limited, however, to enabling users to invest in the performance of characters or players, and the scenarios in which users can invest, make payments, or exchange money may vary according to the design and function of the interactive media management system 100 and the nature of the particular media content production.

Figure 7R:
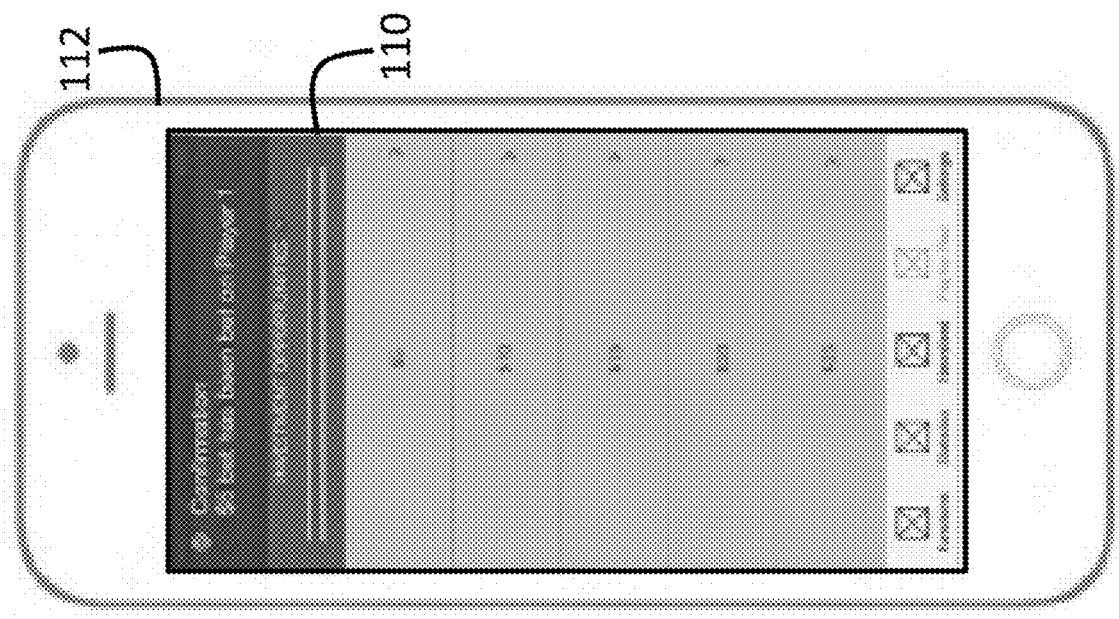

As illustrated in FIG. 7Q, the interactive media application 110 may additionally be configured to display a confirmation notification to the user after identifying parameters of an investment (e.g., investment amount and investment subject), similar to the confirmation notification illustrated in FIG. 7G. As illustrated in FIG. 7R, the interactive media application 110 may additionally display a confirmation message indicating the amount and subject of an investment made by the user. As illustrated in FIG. 7S, the interactive media application 110 may be configured to display a graphical status or summary of investments or payments made by the user.

Figure 7T:
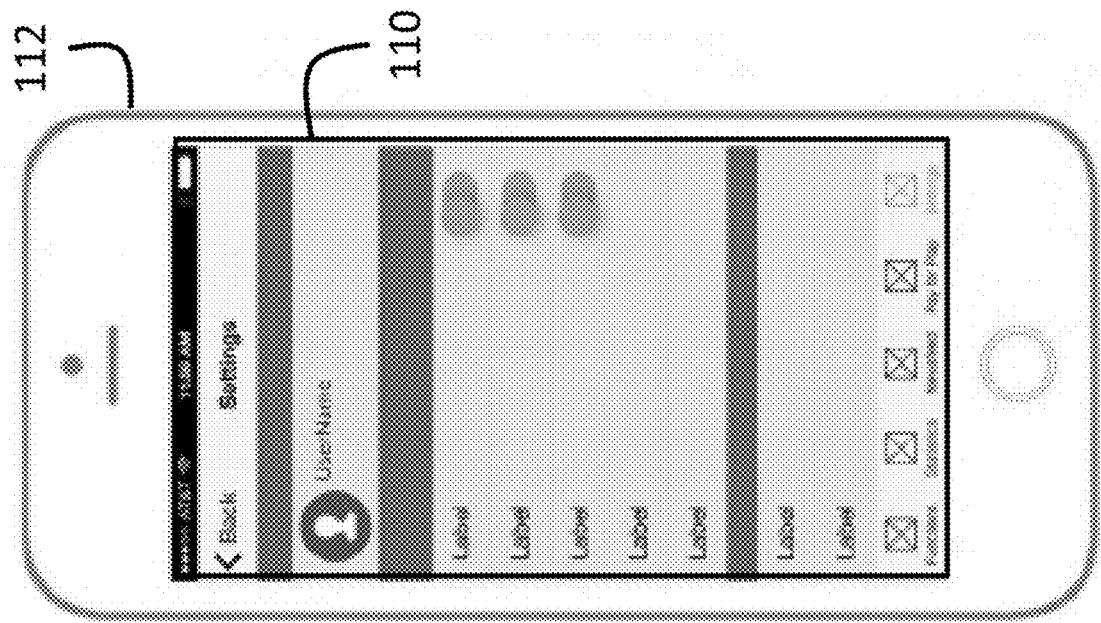
Figure 7S:
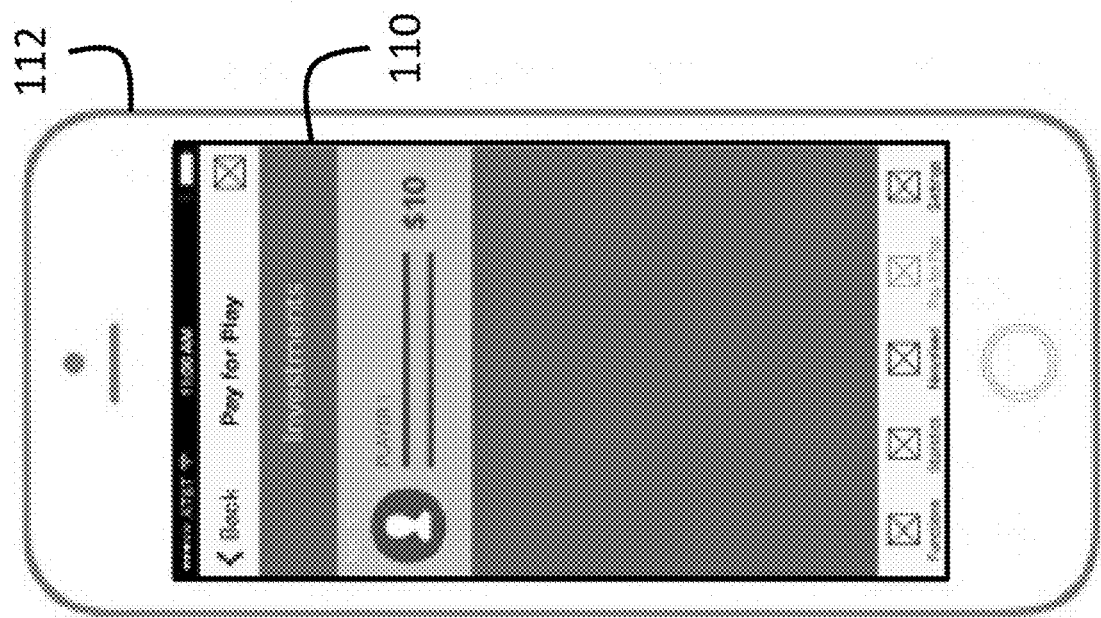

Additionally, as illustrated in FIG. 7T, the interactive media application 110 may be configured to enable users to modify settings, profile information, payment and bank account information, and the like.

According to some example embodiments, as illustrated in FIG. 7U, the interactive media server 108 may be in electronic communication with the electronic devices 112 operated by each of the users or consumers as well as an electronic device (e.g., a media content production device) operated by a media content creator 102. According to some embodiments, the interactive media server 108 may be configured to receive video and audio data corresponding to the broadcast (e.g., the live broadcast) of a media content production in real time during the broadcast. The interactive media server 108 may further be configured to transmit the video and/or audio data (or modified or compressed versions thereof) to the electronic devices 112 for display thereby. According to some example embodiments, the interactive media application 110 operating on each of the electronic devices may be configured to display the received video and/or audio data. Thus, according to some example embodiments, the interactive media server 108 may be configured to facilitate streaming, in real time (e.g., with minimal delay, or less than 1 minute delay), the live broadcast of the media content production from the media content creator to the electronic devices 112 operated by users.

FIGS. 8A-8D illustrate an example user interface for a media content creator interface, according to some example embodiments of the present invention. As discussed above, media content creators or producers may be provided access to a media content creator interface 500. The media content creator interface 500 may be accessible, for example, by way of an application running locally on an electronic device operated by the media content creator. Alternatively, the media content creator interface 500 may be hosted by an external system (e.g., the interactive media server 108), and accessible by way of an internet browser interface.

Figure 8A:
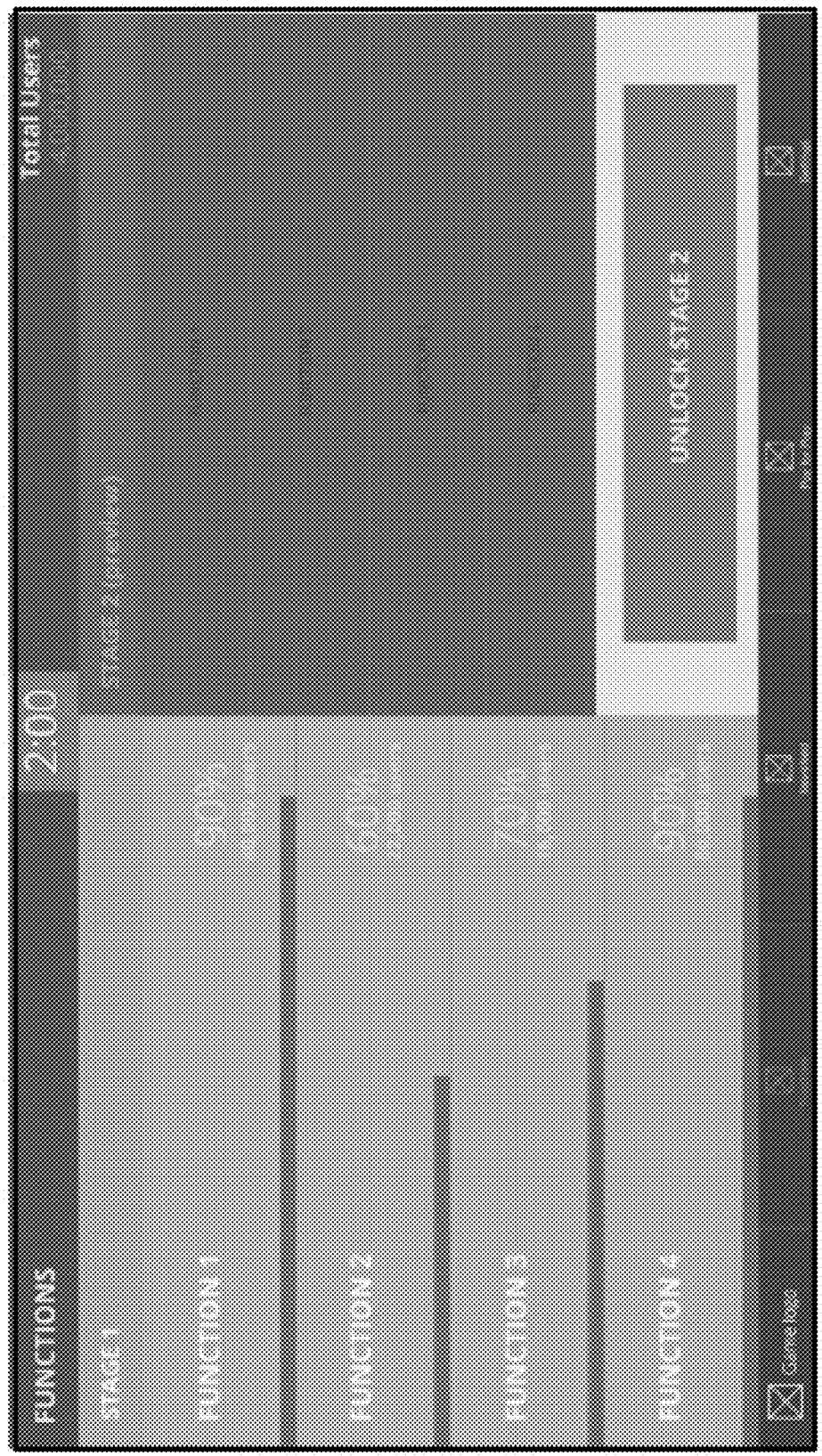
FIGS. 8A-8D illustrate an example user interface for a media content creator interface, according to some example embodiments of the present invention.

Referring to FIG. 8A, during the broadcast of a media content production, the media content creator interface 500 may be configured to display information about the stages of the media content production including, for example, the total number of users actively engaged with the interactive media application 110, and the number or percentage of users who select or vote on a particular function. Additionally, media content creator interface 500 may be configured to display information about upcoming stages, as well as control functionality for unlocking additional stages or implementing selected functions during the broadcast of the media content production. The media content creator interface 500 may also display a timer for indicating the amount of time remaining for a current stage.

Figure 8B:
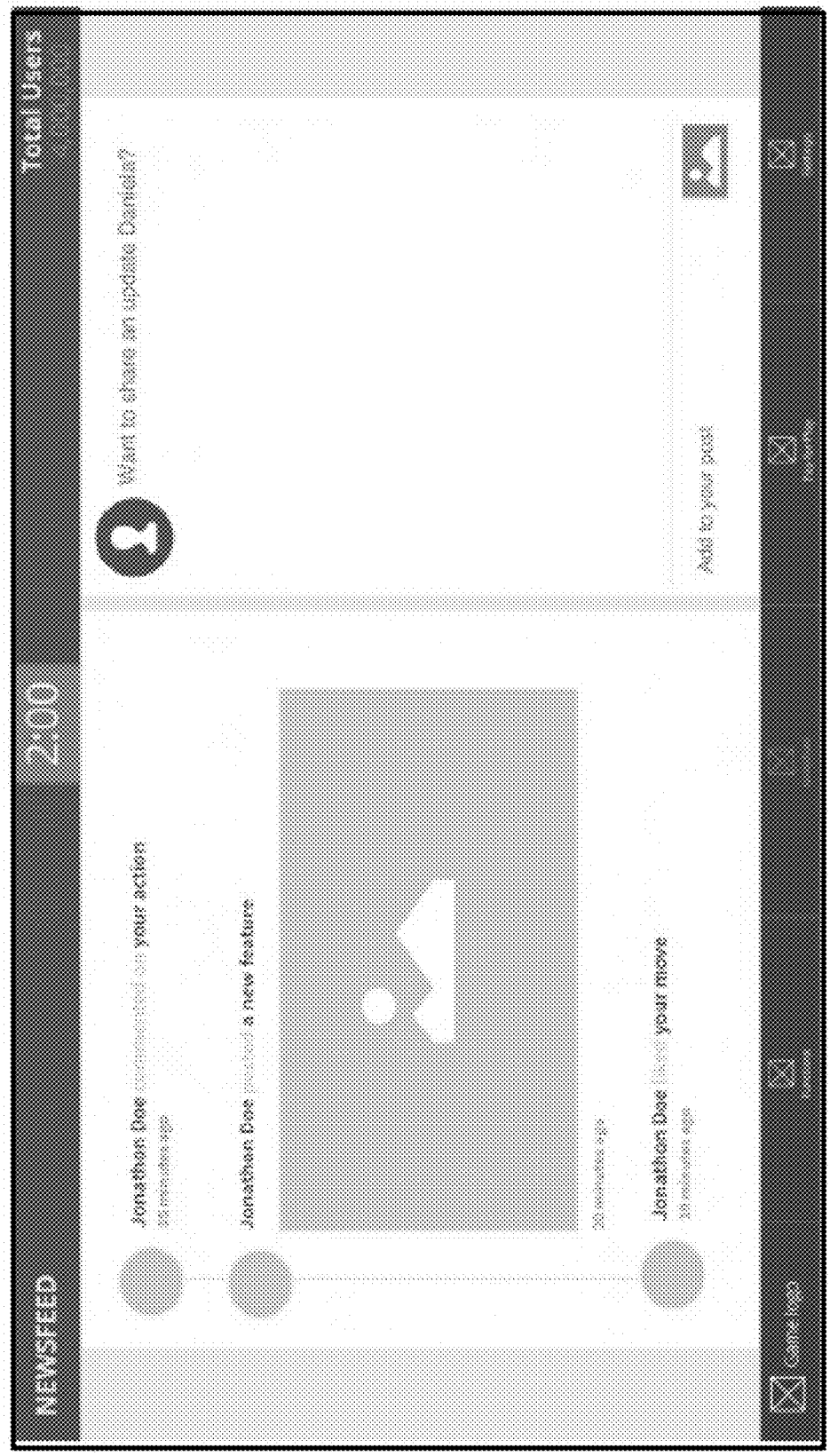

As illustrated in FIG. 8B, the media content creator interface 500 may additionally be configured to display a newsfeed interface for enabling media content producers to interact with one another, or with users of the interactive media application 110.

Figure 8C:
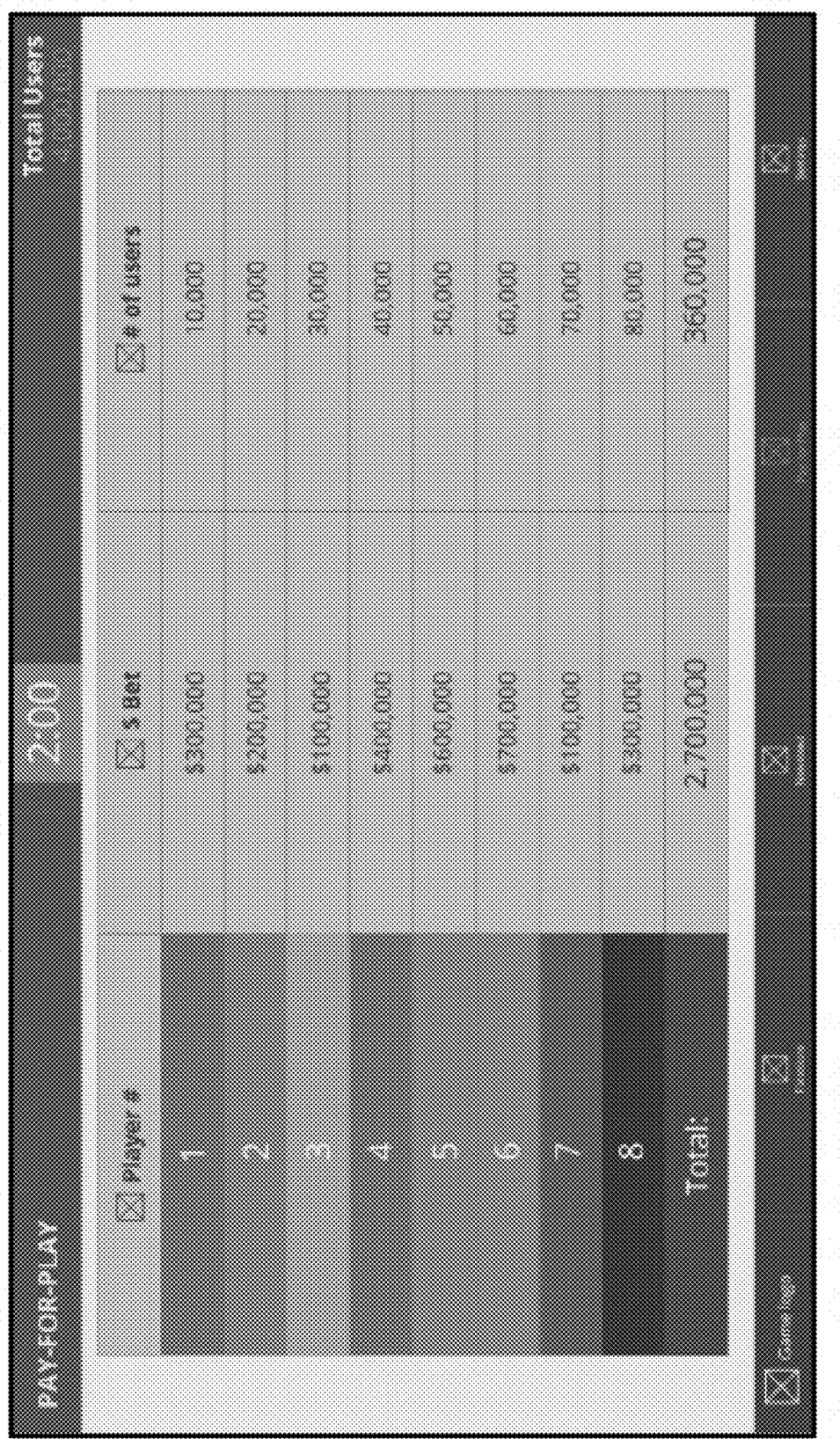
Figure 8D:
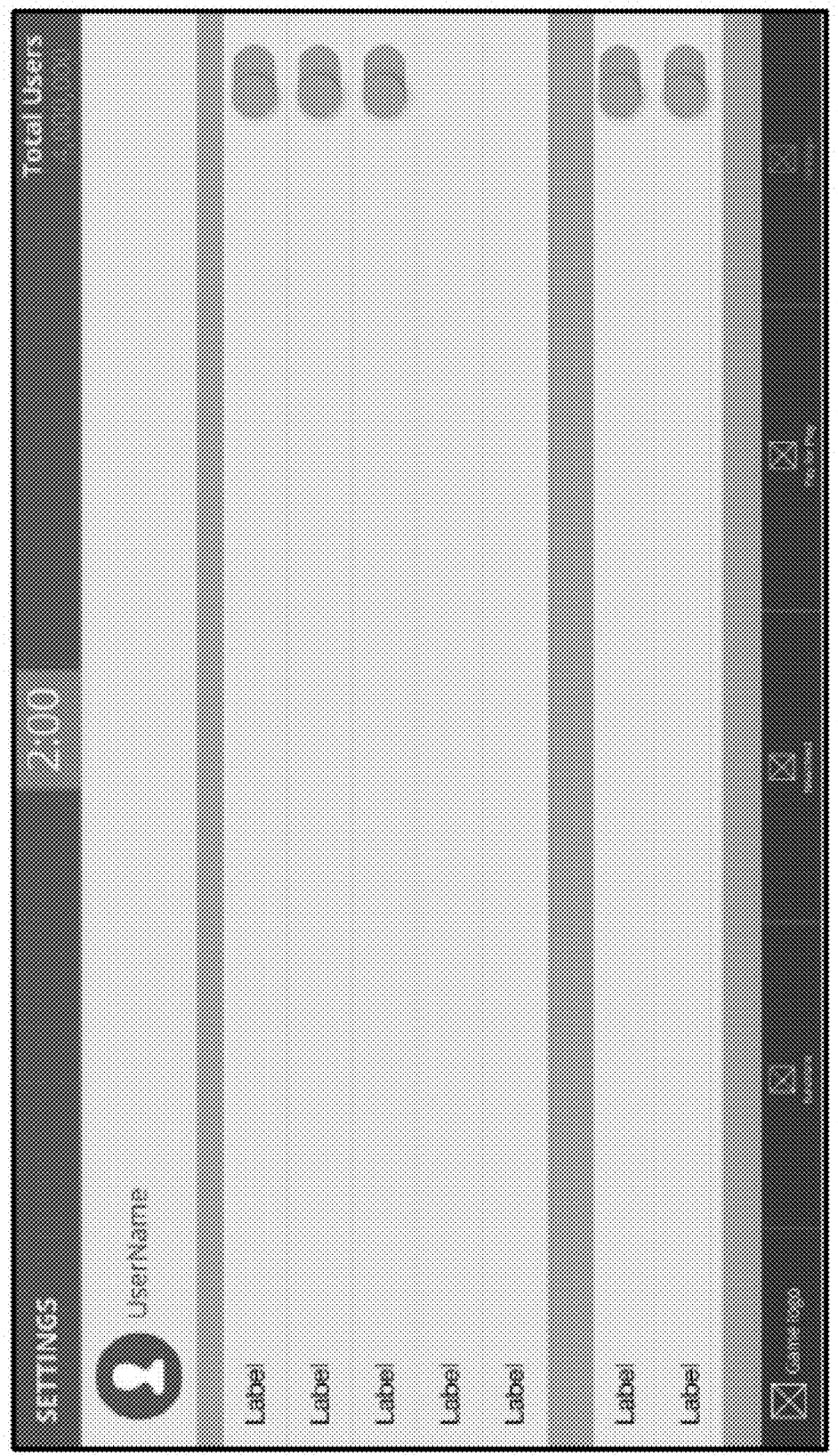

As illustrated in FIG. 8C, the media content creator interface 500 may also be configured to display a graphical representation of investment amounts from users. For example, the media content creator interface 500 may be configured to display a total dollar amount and number of users who invested in each player or character participating in a media content production.

Additionally, like the interactive media application 110, the media content creator interface 500 may be configured to display an interface for enabling media content producers to modify various settings of the media content creator interface 500 or the functions or operation of a particular media content production.

Figure 9:
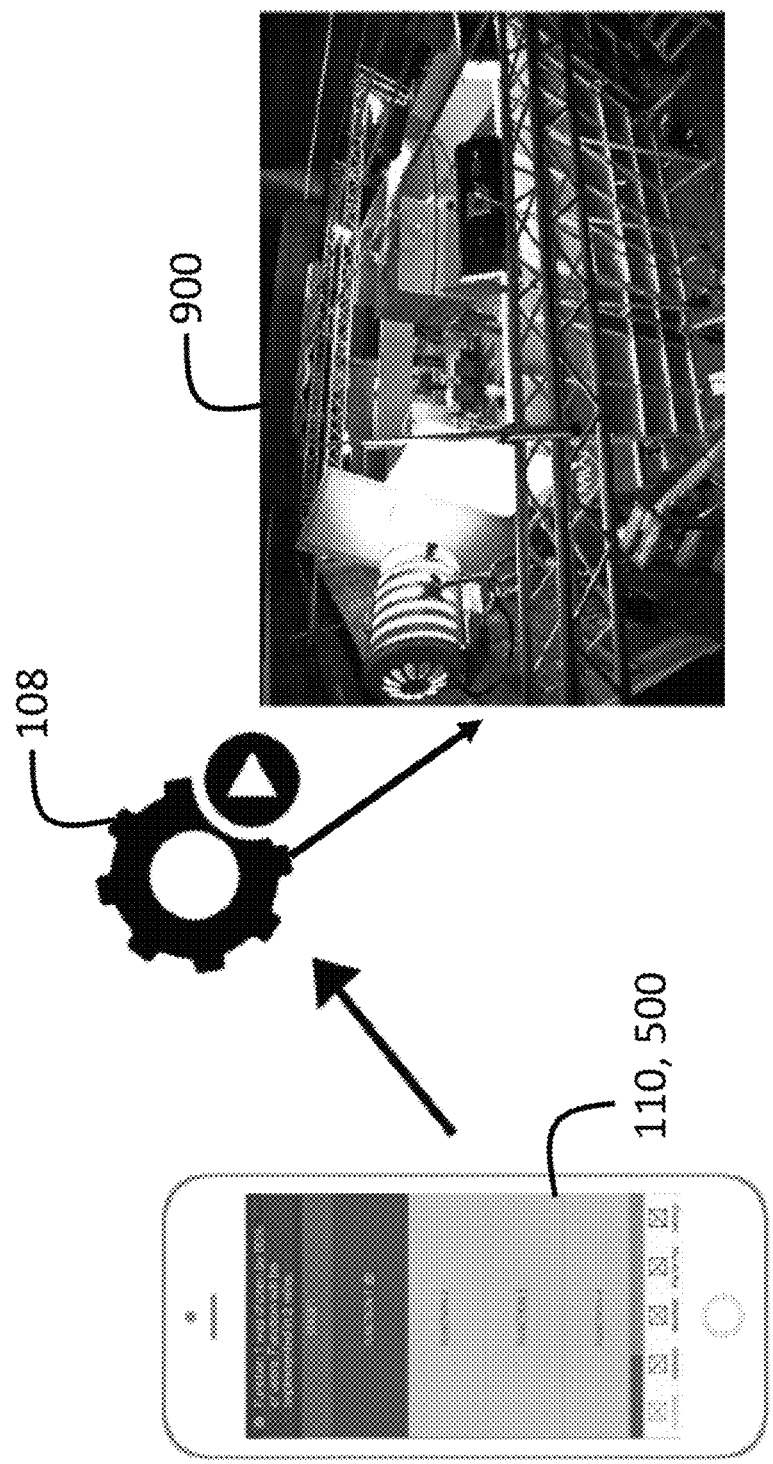
FIG. 9 is a block diagram illustrating an interactive media management system for automatically adjusting aspects of a production stage, according to some example embodiments of the present invention.

FIG. 9 is a block diagram illustrating an interactive media management system for automatically adjusting aspects of a production stage, according to some example embodiments of the present invention.

As illustrated in FIG. 9, according to some example embodiments, the interactive media server 108 may be configured to receive data or signals from the interactive media application 110 operated by users and/or the media content creator interface 500 operated by media content producers. At the same time, the interactive media server 108 may be in electronic communication with various components of an interactive sound stage 900. For example, the interactive sound stage 900 may include various devices for changing or modifying the conditions, environment, or structure of the interactive sound stage 900.

For example, in the context of a media content production of a broadcast of people traversing a haunted house, the interactive sound stage 900 may include components that can electronically generate sounds, fire, or smoke, open or close doors, turn lights on or off, and the like.

The interactive media server 108 may be configured to modify or control various components of the interactive sound stage 900 automatically or in response to signals received from the interactive media application 110 operated by users and/or the media content creator interface 500 operated by media content producers. According to some example embodiments, the interactive media server 108 may be configured to modify or control the various components of the interactive sound stage 900 automatically in response signals or data received from the interactive media application 100 operated by each of the users, without intervention from the media content producer. For example, after the voting is completed for one or more functions to be implemented during a stage of a broadcast media content production, the interactive media server 108 may receive the selections or votes from users through the users' interactive media application 110, aggregate the selections, and automatically implement one or more functions with the highest number or percentage of votes by automatically manipulating or controlling the corresponding components of the interactive sound stage 900 without requiring control or input from a human media content producer.

Although embodiments of the present invention have been described in some detail in the context of various television shows, embodiments of the present invention are not limited to the examples described above. Rather, the interactive media management system 100 may be utilized as part of any suitable media content project in which the experience may be improved by enabling users or audience members to interact with media content creators in real time to influence the direction or progression of the media content.

For example, according to some embodiments, the interactive media management system 100 may operate as part of a live debate or interview segment of a news broadcast, in which media content creators may poll audience members about their opinions in real time, or audience members may ask questions of debaters or the interview guest. In another embodiment, the interactive media management system 100 may operate in conjunction with a live broadcast of a reality television production, for example, in which participants traverse obstacles or a haunted house, and users can influence the nature or character of the obstacles or the haunted house. Embodiments of the present invention are not limited to the example use cases or media content premises described herein. Rather, the particular premise or nature of the media content production may vary, as a person having ordinary skill in the art would appreciate, without departing from the spirit and scope of the present invention.

Figure 10:
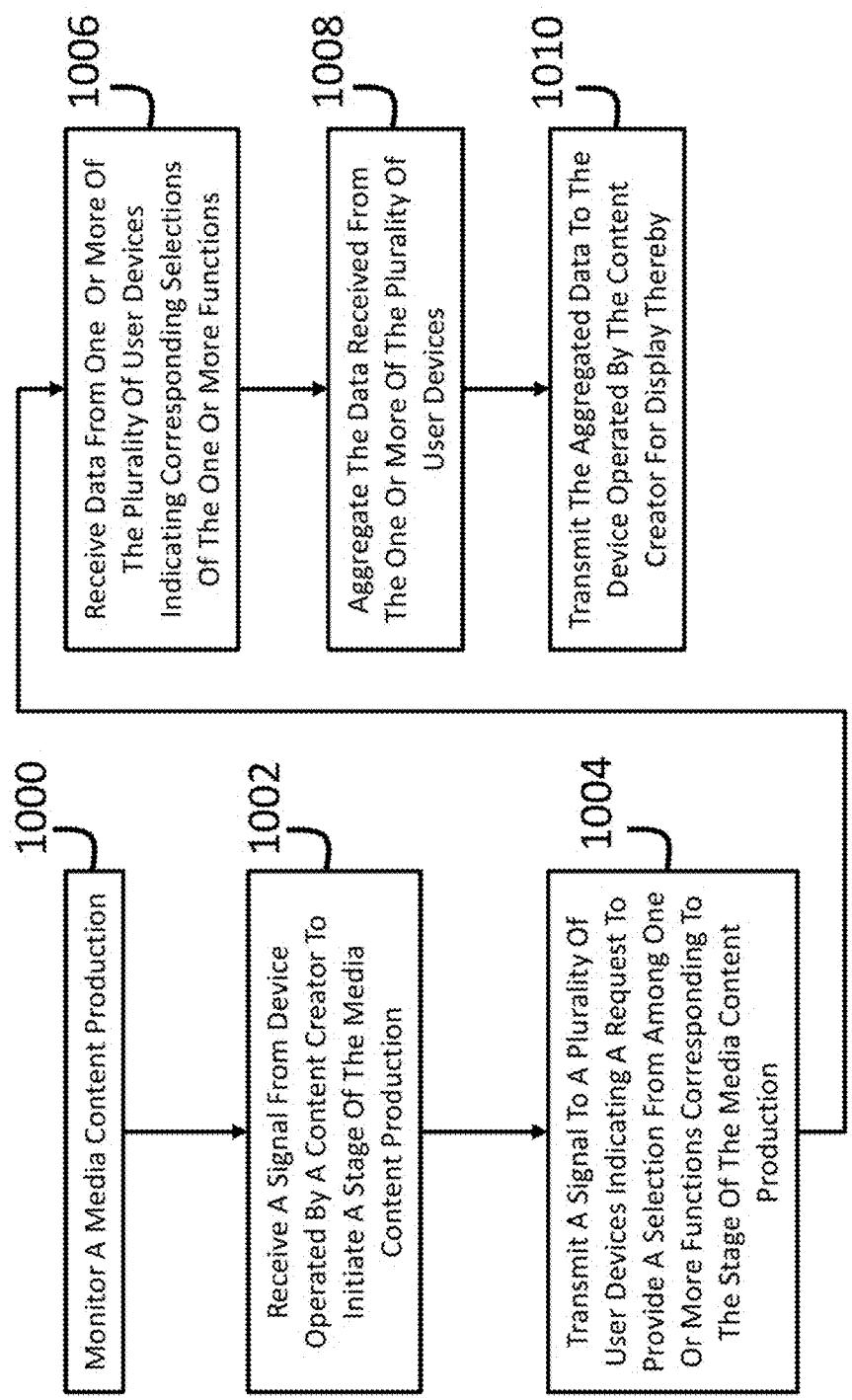
FIG. 10 is a flow diagram illustrating a method for enabling an interactive experience between media content consumers and media content creators, according to some example embodiments of the present invention.

As described above, embodiments of the present invention provide a system and method for enabling an interactive experience between media content consumers and media content creators. FIG. 10 is a flow diagram illustrating a method for enabling an interactive experience between media content consumers and media content creators, according to some example embodiments of the present invention. Embodiments of the present invention are not limited to the operations illustrated in FIG. 10, however, and the number and order of operations may vary according to the design and function of the interactive media management system 100. For example, according to some embodiments, the number of operations may be less than or greater than the number of operations illustrated in FIG. 10.

Referring to FIG. 10, at 1000, the interactive media management system 100 may monitor an ongoing media content production. For example, according to some example embodiments, the interactive media server 108 may be configured to receive data corresponding to an ongoing or live broadcast of a media content production from a device operated or controlled by a media content creator. Such data may include, for example, a video and/or audio stream, as well as information about the status of components or elements in the environment of the production.

At 1002, the interactive media management system 100 (e.g., the interactive media server 108 of the interactive media management system 100) may receive a signal from a device operated by a content creator to initiate a stage of the media content production. For example, as discussed above, according to some example embodiments, the media content creator may be enabled, by way of a media content creator user interface operating on the device operated by the media content creator, to divide or parse a given media content production into one or more "stages" or segments. For each stage, the media content creator may be enabled, by way of the media content creator user interface operating on the device operated by the media content creator, to predefine or predesignate one or more potential functions or actions to occur during the stage of the media content production.

At 1004, the interactive media management system 100 (e.g., the interactive media server 108 of the interactive media management system 100) may transmit a signal to a plurality of user devices operated by users. The signal may indicate a request to provide a selection from among the one or more functions corresponding to the stage of the media content production. In response to receiving the signal, a user interface application operating on an electronic device operated by the users may display an alert or notification message identifying the request, and also providing one or more icons or buttons to facilitate users making a selection from among the one or more functions.

In response to users selecting one of the functions, the users' electronic device may transmit the selections to the interactive media management system 100 (e.g., the interactive media server 108 of the interactive media management system 100). Thus, at 1006, the interactive media management system 100 (or the interactive media server 108 of the interactive media management system 100) may receive data from one or more of the plurality of user devices indicating corresponding selections of the one or more functions.

At 1008, the interactive media management system 100 (or the interactive media server 108 of the interactive media management system 100) may then aggregate the data received from the one or more of the plurality of user devices. Additionally, according to some example embodiments, as discussed above, users may be enabled through the user interface operating on their corresponding electronic device to offer and/or initiate an exchange of currency during the broadcast of the media content production.

At 1010, the interactive media management system 100 (e.g., the interactive media server 108 of the interactive media management system 100) may transmit the aggregated data to the device operated by the media content creator for display thereby. According to some example embodiments, the media content creator may then be enabled, by way of the user interface operating on the content creator device, to initiate or execute the function or actions selected by the users. For example, in some instances, the content creator may execute the function that received the highest percentage of selections from among the users. Such functions may be implemented, according to some example embodiments, in response to a content creator physically controlling or modifying components or elements of the environment of the media content production (e.g., by turning on sound machines or effects machines and the like), or the user interface operating as part of the interactive media management system 100 on the content creator device may be in electronic communication with components or elements of the environment to enable the content creator to control the components or elements through the user interface. Additionally, according to some example embodiments, the interactive media management system 100 may be configured to implement the functions or actions automatically without utilizing any input or control on the part of the content creator. For example, according to some example embodiments, the interactive media server 108 may be in electronic communication with the components or elements of the environment of the media content production that correspond to the various functions. In such instances, the interactive media server 108 may be configured to automatically control or modify the components or elements of the environment of the media content production in response to the selections of users without requiring input from the media content creator.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A system for managing interactive media, the system comprising:
   a processor; and
   a memory coupled to the processor, wherein the memory stores instructions that, when executed by the processor, cause the processor to:
   monitor a broadcast of a live media content production;
   receive a first signal, from a media production device operated by a content producer of the live media content production, to initiate a first stage of the live media content production;
   based on the first signal from the media production device, transmit, in real time during production of the live media content production, a signal to a plurality of user devices indicating a request to provide, within a first predetermined period of time, a selection from among a first finite set of a plurality of functions corresponding to the first stage of the live media content production;
   after transmitting the signal to the plurality of user devices, receive, from one or more of the plurality of user devices, first preference data indicating corresponding selections from among the first finite set of functions for modifying content of the live media content production;
   aggregate the first preference data;
   transmit a signal to the media production device, the signal comprising instructions for changing the live media content production in real time during the broadcast based on the aggregated first preference data;

after a function, from among the first finite set of the plurality of functions and corresponding to the aggregated first preference data, is implemented as part of the first stage of the live media content production, receive a second signal from the media production device operated by the content producer of the live media content production, to initiate a second stage of the live media content production; and based on the second signal from the media production device, transmit, in real time during production of the live media content production, a signal to the plurality of devices indicating a request to provide, within a second predetermined period of time, a selection from among a second finite set of a plurality of functions corresponding to the second stage of the live media content production, wherein the second finite set of the plurality of functions is different from the first finite set of the plurality of functions.

2. The system of claim 1, wherein the instructions further cause the processor to receive, from one or more of the plurality of user devices during the broadcast of the live media content production, data for exchanging currency.

3. The system of claim 1, wherein each of the plurality of user devices are configured to run an application for enabling transmission of the first preference data.

4. The system of claim 3, wherein the application for enabling transmission of the first preference data is configured to display a user interface layered on top of an independent graphical user interface running independently from the application.

5. The system of claim 1, wherein at least one of the plurality of user devices is selected from the group consisting of a personal computer, a television, a smart telephone, and a remote control.

6. The system of claim 1, wherein the instructions further cause the processor to:
receive, from one or more of the plurality of user devices, demographic data corresponding to one or more users operating the one or more of the plurality of user devices; and
transmit the demographic data to the media production device for display thereby.

7. The system of claim 1, wherein the instructions further cause the processor to:
receive, from the media production device, video data corresponding to the broadcast of the live media content production; and
transmit, to one or more of the plurality of user devices, the video data for display thereby.

8. The system of claim 1, wherein the instructions further cause the processor to automatically modify the live media content production during the broadcast in response to the first preference data without human intervention.

9. A method for managing interactive media, the method comprising:
monitoring, by a processor, a broadcast of a live media content production;
receiving, by the processor, a first signal, from a media production device operated by a content producer of the live media content production, to initiate a first stage of the live media content production;
based on the first signal from the media production device, transmitting, in real time during production of the live media content production, by the processor, a signal to a plurality of user devices indicating a request to provide, within a first predetermined period of time, a selection from among a first finite set of a plurality of functions corresponding to the first stage of the live media content production;

after transmitting the signal to the plurality of user devices, receiving, by the processor, from one or more of the plurality of user devices, first preference data indicating corresponding selections from among the first finite set of functions for modifying content of the live media content production;

aggregating, by the processor, the first preference data;

transmitting, by the processor, a signal to the media production device, the signal comprising instructions for changing the live media content production in real time during the broadcast based on the aggregated first preference data;

after a function, from among the first finite set of the plurality of functions and corresponding to the aggregated first preference data, is implemented as part of the first stage of the live media content production, receiving, by the processor, a second signal from the media production device operated by the content producer of the live media content production, to initiate a second stage of the live media content production; and based on the second signal from the media production device, transmitting, by the processor, in real time during production of the live media content production, a signal to the plurality of devices indicating a request to provide, within a second predetermined period of time, a selection from among a second finite set of a plurality of functions corresponding to the second stage of the live media content production, wherein the second finite set of the plurality of functions is different from the first finite set of the plurality of functions.

10. The method of claim 9, further comprising receiving, by the processor, from one or more of the plurality of user devices during the broadcast of the live media content production, data for exchanging currency.

11. The method of claim 9, wherein each of the plurality of user devices are configured to run an application for enabling transmission of the first preference data.

12. The method of claim 11, wherein the application for enabling transmission of the first preference data is configured to display a user interface layered on top of an independent graphical user interface running independently from the application.

13. The method of claim 9, wherein at least one of the plurality of user devices is selected from the group consisting of a personal computer, a television, a smart telephone, and a remote control.

14. The method of claim 9, further comprising:
receiving, by the processor, from one or more of the plurality of user devices, demographic data corresponding to one or more users operating the one or more of the plurality of user devices; and
transmitting, by the processor, the demographic data to the media production device for display thereby.

15. The method of claim 9, further comprising:
receiving, by the processor, from the media production device, video data corresponding to the broadcast of the live media content production; and
transmitting, by the processor, to one or more of the plurality of user devices, the video data for display thereby.

16. The method of claim 9, further comprising automatically modifying, by the processor, the live media content production during the broadcast in response to the first preference data without human intervention.

17. A system for managing interactive media, the system comprising:
- a processor; and
- a memory coupled to the processor, wherein the memory stores instructions that, when executed by the processor, cause the processor to:
  - monitor a broadcast of a live media content production;
  - receive a first signal, from a device operated by a content creator of the live media content production, to initiate a first stage of the live media content production;
  - based on the first signal from the device operated by the content creator, transmit, in real time during production of the live media content production, a signal to a plurality of user devices indicating a request to provide, within a first predetermined period of time, a selection from among a first finite set of a plurality of functions corresponding to the first stage of the live media content production;
  - receive data from one or more of the plurality of user devices indicating corresponding selections from among the first finite set of the plurality of functions;
  - aggregate the data received from the one or more of the plurality of user devices;
  - transmit the aggregated data to the device operated by the content creator for display thereby;
  - after a function, from among the first finite set of the plurality of functions and corresponding to the aggregated data, is implemented as part of the first stage of the live media content production, receive an instruction from the device operated by the content creator a second signal from the device operated by the content creator to initiate a second stage of the live media content production; and
  - based on the second signal from the device operated by the content creator, transmit, in real time during production of the live media content production, a signal to the plurality of devices indicating a request to provide, within a second predetermined period of time, a selection from among a second finite set of a plurality of functions corresponding to the second stage of the live media content production, wherein the second finite set of the plurality of functions is different from the first finite set of the plurality of functions.

18. The system of claim 17, wherein the instructions further cause the processor to automatically modify the live media content production during the broadcast in response to the aggregated data without human intervention.

19. The system of claim 1, wherein the instructions further cause the processor to:
- receive a communication from a first user device corresponding to a first user; and
- transmit the signal corresponding to the communication from the first user device to a message exchange medium accessible by a second user device corresponding to a second user.

20. The system of claim 1, wherein the instructions further cause the processor to:
- transmit the broadcast of the live media content production to a user device from among the user devices.

* * * * *